(12) United States Patent
Iwami et al.

(10) Patent No.: US 10,582,376 B2
(45) Date of Patent: Mar. 3, 2020

(54) INFORMATION PROCESSING APPARATUS, INFORMATION PROCESSING METHOD, AND SOURCE APPARATUS

(71) Applicant: SONY CORPORATION, Tokyo (JP)

(72) Inventors: Hideki Iwami, Saitama (JP); Tomoya Yamaura, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/510,748

(22) PCT Filed: May 25, 2016

(86) PCT No.: PCT/JP2016/065474
§ 371 (c)(1),
(2) Date: Mar. 13, 2017

(87) PCT Pub. No.: WO2017/018042
PCT Pub. Date: Feb. 2, 2017

(65) Prior Publication Data
US 2019/0090125 A1   Mar. 21, 2019

(30) Foreign Application Priority Data
Jul. 24, 2015   (JP) .................................. 2015-147257

(51) Int. Cl.
*H04N 21/45* (2011.01)
*H04W 28/02* (2009.01)
(Continued)

(52) U.S. Cl.
CPC ............. *H04W 8/24* (2013.01); *G06F 13/00* (2013.01); *H04L 65/601* (2013.01);
(Continued)

(58) Field of Classification Search
None
See application file for complete search history.

(56) References Cited

U.S. PATENT DOCUMENTS

| 2014/0022329 A1 | 1/2014 | Kim et al. |
| 2014/0211025 A1 | 1/2014 | Hiramatsu |

(Continued)

FOREIGN PATENT DOCUMENTS

| CN | 103546716 A | 1/2014 |
| EP | 2688295 A2 | 1/2014 |

(Continued)

OTHER PUBLICATIONS

International Search Report of PCT Application No. PCT/JP2016/065474, dated Aug. 16, 2016, 2 pages.

(Continued)

*Primary Examiner* — Mohamed A Kamara
(74) *Attorney, Agent, or Firm* — Chip Law Group

(57) ABSTRACT

To provide an information processing apparatus that receives image data through wireless communication. By newly providing an RTSP parameter having high affinity with Miracast Release1, resources on a wireless section are reduced and the communication sequence in which a user does not feel the waiting time is achieved in the communication sequence in which a medium setting value of a source apparatus is changed in response to a request from a sink apparatus. Further, in a multi-source topology environment in which a plurality of images based on image data transmitted from a plurality of source apparatuses are displayed on a display unit of the sink apparatus, it is possible to present a band control method in which a data transmission rate is assigned as much as possible.

11 Claims, 25 Drawing Sheets

(51) Int. Cl.
  *H04W 8/24* (2009.01)
  *H04W 8/14* (2009.01)
  *H04W 84/12* (2009.01)
  *H04L 29/06* (2006.01)
  *H04N 21/4363* (2011.01)
  *H04W 92/18* (2009.01)
  *G06F 13/00* (2006.01)
  *H04W 72/04* (2009.01)

(52) U.S. Cl.
  CPC ....... *H04L 65/608* (2013.01); *H04N 21/4363* (2013.01); *H04N 21/43637* (2013.01); *H04N 21/4516* (2013.01); *H04W 8/14* (2013.01); *H04W 28/0215* (2013.01); *H04W 72/048* (2013.01); *H04W 84/12* (2013.01); *H04W 92/18* (2013.01)

(56) References Cited

U.S. PATENT DOCUMENTS

| | | | | |
|---|---|---|---|---|
| 2014/0334381 | A1* | 11/2014 | Subramaniam | H04L 65/604 370/328 |
| 2015/0002369 | A1 | 1/2015 | Araki | |
| 2016/0065893 | A1 | 3/2016 | Kim et al. | |
| 2016/0073155 | A1* | 3/2016 | Subramaniam | H04N 21/4316 725/32 |
| 2016/0110151 | A1* | 4/2016 | Isonishi | G06F 3/1454 345/2.2 |
| 2016/0112587 | A1 | 4/2016 | Hiramatsu | |
| 2016/0191992 | A1* | 6/2016 | Kwon | H04N 21/43615 725/30 |
| 2016/0295296 | A1* | 10/2016 | Zhu | H04N 21/4126 |
| 2016/0308917 | A1* | 10/2016 | Veeramani | H04L 65/1069 |
| 2018/0017629 | A1* | 1/2018 | Park | G01R 31/36 |
| 2018/0234978 | A1* | 8/2018 | Shao | H04W 72/02 |

FOREIGN PATENT DOCUMENTS

| | | |
|---|---|---|
| JP | 2009-094799 A | 4/2009 |
| JP | 2013-098903 A | 5/2013 |
| JP | 2014-023158 A | 2/2014 |
| JP | 5521774 B2 | 6/2014 |
| JP | 2014-147037 A | 8/2014 |
| JP | 2015-012512 A | 1/2015 |
| JP | 2015-049641 A | 3/2015 |
| JP | 2015-070568 A | 4/2015 |
| WO | 2014/014238 A1 | 1/2014 |

OTHER PUBLICATIONS

Written Opinion of PCT Application No. PCT/JP2016/065474, dated Aug. 16, 2016, 3 pages.

\* cited by examiner

```
[Sink→Source]
SET_PARAMETER rstp://10.82.24.140/wfd1.0/streamed=0 RTSP/1.0
Cseq: n
Content-Type: text/parameters
Content-Length: 79
Session: xxxxxxxx ext_cmd_22: 00 00 02 04 00000004 00000000 00000000 00 0000 0000 00 none none

[Source→Sink]
RSTP/1.0 200 OK
Cseq: n
Session: xxxxxxxx

[Source→Sink]
SET_PARAMETER rtsp://localhost/wfd1.0 RTSP/1.0
Cseq: m
Content-Type: text/parameters
Content-Length: 137
Session: xxxxxxxx wfd_av_format_change¥timing: 0000000000 0000000000
wfd_video_formats: 00 00 02 04 00000004 00000000 00000000 00 0000 0000 00 none none

[Sink→Source]
RSTP/1.0 200 OK
Cseq: m
Session: xxxxxxxx
```

FIG.12

```
[Sink→Source]
SET_PARAMETER rstp://10.82.24.140/wfd1.0/streamed=0 RTSP/1.0
Cseq: n
Content-Type: text/parameters
Content-Length: 17
Session: xxxxxxxx ext_cmd_21: 50

[Source→Sink]
RSTP/1.0 200 OK
Cseq: n
Session: xxxxxxxx
```

FIG.13

```
[Sink→Source]
SET_PARAMETER rstp://10.82.24.140/wfd1.0/streamed=0 RTSP/1.0
Cseq: n
Content-Type: text/parameters
Content-Length: 22
Session: xxxxxxxx ext_cmd_21: 80 6000

[Source→Sink]
RSTP/1.0 200 OK
Cseq: n
Session: xxxxxxxx
```

FIG.14

```
GET_PARAMETER rtsp://localhost/wfd1.0 RTSP/1.0
CSeq: i+1
Content-Type: text/parameters
Content-Length: 168 wfd_video_formats
wfd_audio_codecs
wfd_3d_video_formats
wfd_content_protection
wfd_display_edid
wfd_coupled_sink
wfd_client_rtp_ports
ext_reverse_get_parameter
```

```
RTSP/1.0 200 OK
CSeq: i+1
Content-Length: 328
Content-Type: text/parameters wfd_video_formats: 00 00 01 01 00000001 00000000 00000000 00 0000 0000 00 none none
wfd_audio_codecs: LPCM 00000003 00
wfd_3d_video_formats: none
wfd_content_protection: none
wfd_display_edid: none
wfd_coupled_sink: none
wfd_client_rtp_ports: RTP/AVP/UDP;unicast 1028 0 mode=play
ext_reverse_get_parameter: Supported
```

FIG.22

```
GET_PARAMETER rtsp://localhost/wfd1.0 RTSP/1.0
CSeq: j+1
Content-Type: text/parameters
Content-Length: 27 ext_reverse_get_parameter
```

FIG.23

```
RTSP/1.0 200 OK
CSeq: j+1
Content-Type: text/parameters
Content-Length: 38 ext_reverse_get_parameter: Supported
```

FIG.24

```
[Sink→Source]
SET_PARAMETER rstp://10.82.24.140/wfd1.0/streamed=0 RTSP/1.0
Cseq: n
Content-Type: text/parameters
Content-Length: 22
Session: xxxxxxxx ext_cmd_23: 30

[Source→Sink]
RSTP/1.0 200 OK
Cseq: n
Session: xxxxxxxx
```

FIG.29

INFORMATION PROCESSING APPARATUS, INFORMATION PROCESSING METHOD, AND SOURCE APPARATUS

CROSS REFERENCE TO RELATED APPLICATIONS

This application is a U.S. National Phase of International Patent Application No. PCT/JP2016/065474 filed on May 25, 2016, which claims priority benefit of Japanese Patent Application No. JP 2015-147257 filed in the Japan Patent Office on Jul. 24, 2015. Each of the above-referenced applications is hereby incorporated herein by reference in its entirety.

TECHNICAL FIELD

The technology disclosed in the specification relates to an information processing apparatus and an information processing method that receive image data through wireless communication.

BACKGROUND ART

In a wireless LAN (Local Area Network) system defined by IEEE (Institute of Electrical and Electronics Engineers) 802.11, wireless communication between stations that operate as child devices is performed via an access point that operates as a parent device.

On the other hand, Wi-Fi Direct, which is a specification developed by a Wi-Fi (Wireless Fidelity) alliance that is an organization for promoting wireless LAN, provides an operation mode where apparatuses directly communicate on a one-to-one basis (in peer-to-peer fashion). A wireless LAN device having a function of Wi-Fi Direct is capable of performing an operation of being connected to an access point in an infrastructure mode to perform communication and an operation of being connected to another wireless LAN device that supports Wi-Fi Direct by Wi-Fi Direct to perform operation (see, for example, Patent Literature 1).

Further, as short-range wireless AV (Audio Visual) transmission communication, Wi-Fi CERTIFIED Miracast can be used, for example. The Wi-Fi CERTIFIED Miracast is a mirroring technology in which audio or display video to be reproduced in one terminal is transmitted to a different terminal and the different terminal outputs the audio or video data as well, by using the technology of Wi-Fi Direct or TDLS (Tunneled Direct Link Setup). In the Wi-Fi CERTIFIED Miracast, a UIBC (User Input Back Channel) is implemented on a TCP/IP (Transmission Control Protocol/Internet Protocol). The UIBC is a technology for transmitting the operation information of input devices such as a mouse and a keyboard from one terminal to a different terminal (see, for example, Patent Literature 2).

CITATION LIST

Patent Literature

Patent Literature 1: Japanese Patent No. 5521774
Patent Literature 2: Japanese Patent Application Laid-open No. 2015-70568

DISCLOSURE OF INVENTION

Technical Problem

It is an object of the technology disclosed in the specification to provide an excellent information processing apparatus and an excellent information processing method that are capable of favorably receiving image data through wireless communication.

Solution to Problem

The technology disclosed in the specification has been made in view of the above-mentioned circumstances, and a first aspect thereof is an information processing apparatus that receives data from a different information processing apparatus, the different information processing apparatus being wirelessly connected to the information processing apparatus, the information processing apparatus including:
a Capability information transmission unit that transmits Capability information of the information processing apparatus in response to an inquiry from the different information processing apparatus;
a control unit that controls a medium setting value related to the different information processing apparatus on the basis of the Capability information related to the information processing apparatus, resolution information related to communication with the different information processing apparatus, and a reproduction output format of the data received by the information processing apparatus; and a medium setting value transmission unit that transmits information related to the medium setting value selected by the control unit to the different information processing apparatus.

In a second aspect of the technology disclosed in the specification, the Capability information transmission unit of the information processing apparatus according to the first aspect is configured to transmit the Capability information of the information processing apparatus as Capability Negotiation processing of Miracast Release1, and the medium setting value transmission unit is configured to transmit information related to the medium setting value as processing of extending a Miracast function.

In a third aspect of the technology disclosed in the specification, the information processing apparatus according to the second aspect is configured to receive the resolution information related to communication with the different information processing apparatus as the Capability Negotiation processing.

In a fourth aspect of the technology disclosed in the specification, the information processing apparatus according to the first aspect further includes an extended function transmission unit that sends back a response message containing an RTSP parameter that represents whether or not Miracast extended function information is implemented, in response to reception of a request message containing an RTSP parameter for requesting for Miracast extended function information from the different information processing apparatus.

In a fifth aspect of the technology disclosed in the specification, the information processing apparatus according to the first aspect further includes a medium setting value inquiry unit that makes an inquiry to the different information processing apparatus about a medium setting value that the different information processing apparatus is capable of transmitting. Then, the control unit is configured to control the medium setting value related to the different information processing apparatus on the basis of a response to the inquiry.

In a sixth aspect of the technology disclosed in the specification, the control unit of the information processing apparatus according to the first aspect is configured to control a medium setting value for increasing or decreasing a data transmission rate with reference to the medium setting value that is currently set.

In a seventh aspect of the technology disclosed in the specification, the control unit of the information processing apparatus according to the sixth aspect is configured to make a request for changing a medium setting value by using min (that designates a value of a term having the minimum value, of terms common to the different information processing apparatus), max (that designates a value of a term having the maximum value, of the terms common to the different information processing apparatus), down (that designates a value of a term one level lower than the term that is currently used), and up (that designates a value of a term one level higher than the term that is currently used).

In an eighth aspect of the technology disclosed in the specification, the medium setting value transmission unit of the information processing apparatus according to the seventh aspect is configured to transmit a request for changing a medium setting value using an RTSP parameter.

In an ninth aspect of the technology disclosed in the specification, the control unit of the information processing apparatus according to the fifth aspect is configured to select one or more medium setting values that are common to the medium setting value that the information processing apparatus is capable of receiving and the medium setting value that the different information processing apparatus is capable of transmitting, and controls the medium setting value related to the different information processing apparatus.

In a tenth aspect of the technology disclosed in the specification, the medium setting value transmission unit of the information processing apparatus according to the ninth aspect is configured to transmit a request for changing the medium setting value that directly designates the one or more medium setting values using an RTSP parameter.

Further, an eleventh aspect of the technology disclosed in the specification is an information processing method, which is executed by an information processing apparatus that receives data from a different information processing apparatus, the different information processing apparatus being wirelessly connected to the information processing apparatus, the information processing method including:

transmitting Capability information of the information processing apparatus in response to an inquiry from the different information processing apparatus;

controlling a medium setting value related to the different information processing apparatus on the basis of the Capability information related to the information processing apparatus, resolution information related to communication with the different information processing apparatus, and a reproduction output format of the data received by the information processing apparatus; and transmitting information related to the medium setting value selected by the control unit to the different information processing apparatus.

Further, a twelfth aspect of the technology disclosed in the specification is a source apparatus directly connected to a sink apparatus on the basis of a wireless LAN system, the source apparatus including:

a control unit that has system performance information of the sink apparatus;

a reception unit that receives a SET PARAMETER REQUEST based on RTSP from the sink apparatus, the SET PARAMETER REQUEST requesting for a resolution higher than the resolution that is currently used; and a transmission unit that performs streaming transmission by using a resolution supported by the source apparatus and the sink apparatus in response to the SET PARAMETER REQUEST.

Advantageous Effects of Invention

According to the technology disclosed in the specification, it is possible to provide an information processing apparatus and an information processing method that receive image data through wireless communication.

Note that the effects described in the specification are merely examples. The effects of the present invention are not limited thereto. Further, the present invention may provide additional effects other than the above-mentioned effects.

These and other objects, features and advantages of the technology disclosed in the specification will become more apparent in light of the following detailed description on the basis of the embodiments to be described later or the accompanying drawings.

BRIEF DESCRIPTION OF DRAWINGS

FIG. 12 is a diagram showing a usage example of an RTSP additional RTSP message in the case where the sink apparatus requests the source apparatus to change a resolution.

FIG. 13 is a diagram showing a usage example of an RTSP additional RTSP message in the case where the sink apparatus requests the source apparatus to change a bit rate.

FIG. 14 is a diagram showing a usage example of an RTSP additional RTSP message in the case where the sink apparatus requests the source apparatus to change a bit rate while designating a data transmission rate.

FIG. 22 is a diagram showing an example of an RTSP M3 Response message.

FIG. 23 is a diagram showing an example of an RTSP M3R Request message.

FIG. 24 is a diagram showing an example of an RTSP M3R Response message.

FIG. 29 is a diagram showing a usage example of an RTSP additional RTSP message in the case where the sink apparatus requests the source apparatus to change a refresh rate.

MODE(S) FOR CARRYING OUT THE INVENTION

Hereinafter, embodiments of the technology disclosed in the specification will be described in detail with reference to the drawings.

[Communication Example when Application Starts Operation]

Figure 5:
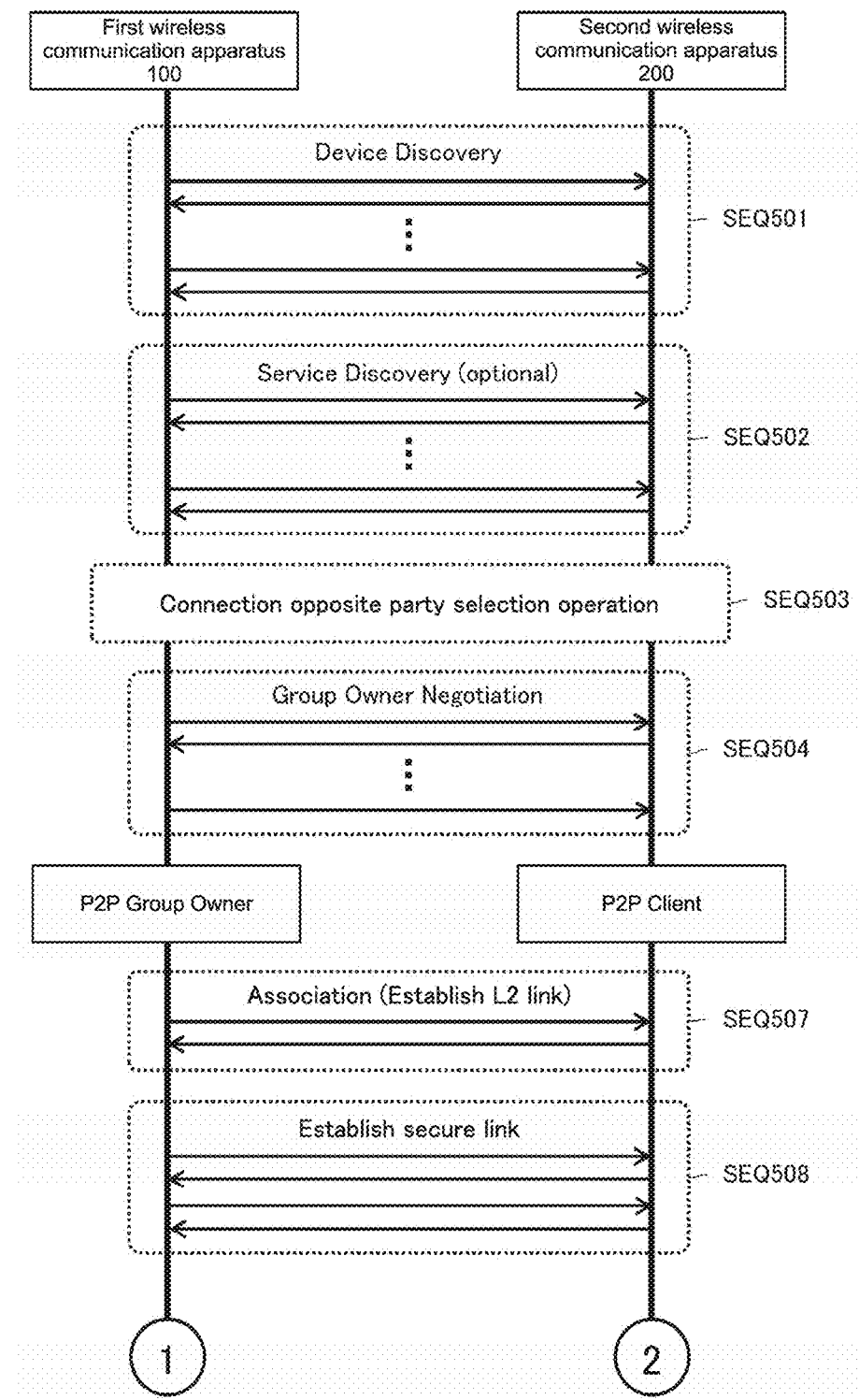
FIG. 5 is a diagram showing an example of communication processing executed between a first wireless communication apparatus 100 and a second wireless communication apparatus 200.
Figure 6:
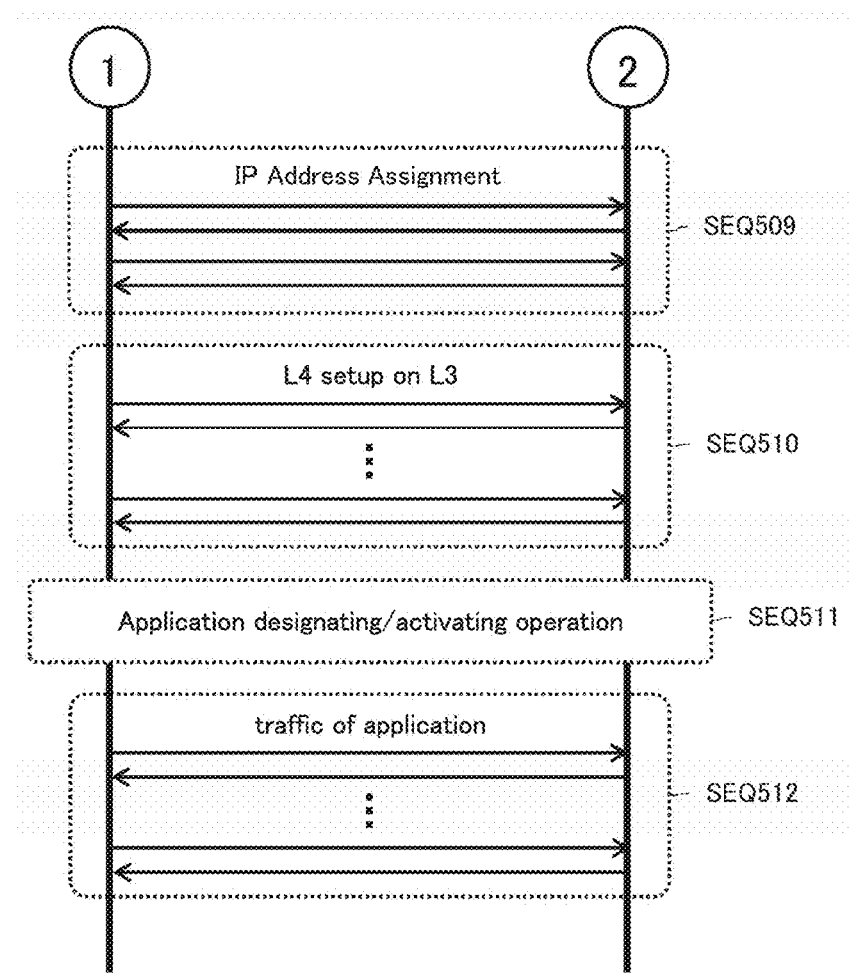
FIG. 6 is a diagram showing an example of communication processing executed between the first wireless communication apparatus 100 and the second wireless communication apparatus 200.

In FIG. 5 and FIG. 6, an example of communication processing executed between a first wireless communication apparatus 100 and a second wireless communication apparatus 200 is shown in the sequence/chart format. Specifically, each diagram shows an example of the procedure in which direct connection that leads to connection in the Wi-Fi Direct (Direct) standard (also referred to as Wi-Fi P2P in some cases) normalized in Wi-Fi Alliance is established.

In Wi-Fi Direct, a plurality of wireless communication apparatuses detect each other's presence (Device Discovery, Service Discovery). Then, when apparatuses to be connected are selected, apparatus authentication is performed in WPS (Wi-Fi Protected Setup) between the selected apparatus, and thus, direct connection is established. Further, in Wi-Fi Direct, a plurality of wireless communication apparatuses determine to play a role of one of a parent device (Group Owner) and a child device (Client), and form a communication group.

Note that in the communication processing example shown in FIG. 5 and FIG. 6, illustration of a part of packet transmission/reception is omitted and detailed description thereof is not made in the following. For example, as described above, packet switching for using WPS is necessary at the time of initial connection, and packet switching is necessary also for exchanging Authentication Request/Response. Regarding the detail thereof, see the specifications of Wi-Fi Direct (Direct) standard.

Further, although an example of communication processing between the first wireless communication apparatus 100 corresponding to a source apparatus and the second wireless communication apparatus 200 corresponding to a sink apparatus is shown in FIG. 5 and FIG. 6, it should be understood that a similar sequence/chart is obtained also in communication processing between other wireless communication apparatuses.

The procedure of wireless packet transmission/reception to establish P2P (Peer to Peer) connection and cause an application to operate will be described with reference to FIG. 5 and FIG. 6.

First, Device Discovery is performed between the first wireless communication apparatus (source apparatus) 100 and the second wireless communication apparatus (sink apparatus) 200 (SEQ501). For example, the first wireless communication apparatus 100 transmits Probe request (response request signal) and receives Probe response (response signal) to this Probe request from the second wireless communication apparatus 200. Accordingly, the first wireless communication apparatus 100 and the second wireless communication apparatus 200 are capable of discovering each other's presence. Further, by Device Discovery, it is possible to acquire the name or kind of an opposite party device (TV, PC, smartphone, etc.).

Next, arbitrary Service Discovery is performed between the first wireless communication apparatus 100 and the second wireless communication apparatus 200 (SEQ502). For example, the first wireless communication apparatus 100 transmits Service Discovery Query for making an inquiry about service supported by the second wireless communication apparatus 200 discovered by Device Discovery. Then, the first wireless communication apparatus 100 receives Service Discovery Response from the second wireless communication apparatus 200, thereby acquiring the service supported by the second wireless communication apparatus 200. Specifically, by Service Discovery, it is possible to acquire service that can be performed by the opposite party, and the like. Examples of the service that can be performed by the opposite party include service, protocol (DLNA (registered trademark) (Digital Living Network Alliance) DMR (Digital Media Renderer) etc.).

Next, an operation of selecting a connection opposite party (connection opposite party selection operation) is performed by a user (SEQ503). In some cases, this connection opposite party selection operation is performed on only one of the first wireless communication apparatus 100 and the second wireless communication apparatus 200. For example, a connection opposite party selection screen is displayed on a display unit of the first wireless communication apparatus 100, and the second wireless communication apparatus 200 is selected as a connection opposite party by a user's operation on this connection opposite party selection screen.

When the connection opposite party selection operation is performed by a user (SEQ503), Group Owner Negotiation is performed between the first wireless communication apparatus 100 and the second wireless communication apparatus 200 (SEQ504). In the example shown in FIG. 5 and FIG. 6, the first wireless communication apparatus 100 is a group owner (Group Owner) and the second wireless communication apparatus 200 is a client (Client) as a result of Group Owner Negotiation.

Next, each processing of SEQ507 to SEQ510) is performed between the first wireless communication apparatus 100 and the second wireless communication apparatus 200, thereby establishing direct connection. Specifically, Association (establish L2 (second layer) link) (SEQ507) and establishing Secure link (SEQ508) are sequentially performed. Further, IP Address Assignment (SEQ509) and L4 setup (SEQ510) are sequentially performed. In SEQ510, for example, WFDS (Wi-Fi Direct Services) or the like is assumed to be used.

Next, an operation of designating or activating an application (application designating/activating operation) is performed by a user (SEQ511). In some case, this application designating/activating operation is performed on only one of the first wireless communication apparatus 100 and the second wireless communication apparatus 200. For example, an application designating/activating screen (to be described later) is displayed on the display unit of the first wireless communication apparatus 100, and a desired application is selected by a user's operation on this application designating/activating screen.

When the application designating/activating operation is performed by a user (SEQ511), the application corresponding to this application designating/activating operation is executed between the first wireless communication apparatus 100 and the second wireless communication apparatus 200 (SEQ512).

Note that in the case where an access point (Access Point) and a terminal station (Station) are connected to each other within the range of the specification before the Wi-Fi Direct standard (i.e., specification normalized by IEEE802.11), it is hard to know to what device it is connected in advance before being connected in the second layer (also referred to as "before association" in the word of IEEE802.11).

On the other hand, in the Wi-Fi Direct standard, it is possible to acquire information on a connection opposite party when searching for a candidate of the connection opposite party in Device discovery or Service Discovery (option) as shown in FIG. 5 and FIG. 6. Examples of this information on a connection opposite party include the type of a basic device and a supported application. Then, it is possible to cause a user to select a connection opposite party on the basis of the acquired information on a connection opposite party.

Now, a case the first wireless communication apparatus 100 as the source apparatus is desired to change a medium setting value (e.g., a resolution, an image compression method, an audio compression method, a video or audio output format, etc.) in response to a request from the second wireless communication apparatus 200 as the sink apparatus after connection in the second layer will be considered. In the existing Miracast standard (Release1), a message is not defined to change a medium setting value of the source apparatus after connection in the second layer. As a result, it needs to cause the source apparatus and the sink apparatus to transmit/receive an individual RTSP (Real Time Streaming Protocol) message to/from each other. Alternatively, in the case where the source apparatus and the sink apparatus are caused to operate within the range of the existing Miracast standard (Release1), it needs to cut connection once, cause the source apparatus to request for the Capability information of the sink apparatus, and set the medium setting value of the source apparatus requested by the sink apparatus in the Capability information returned from the sink apparatus.

[Communication Example when Application Starts Operation]

Figure 7:
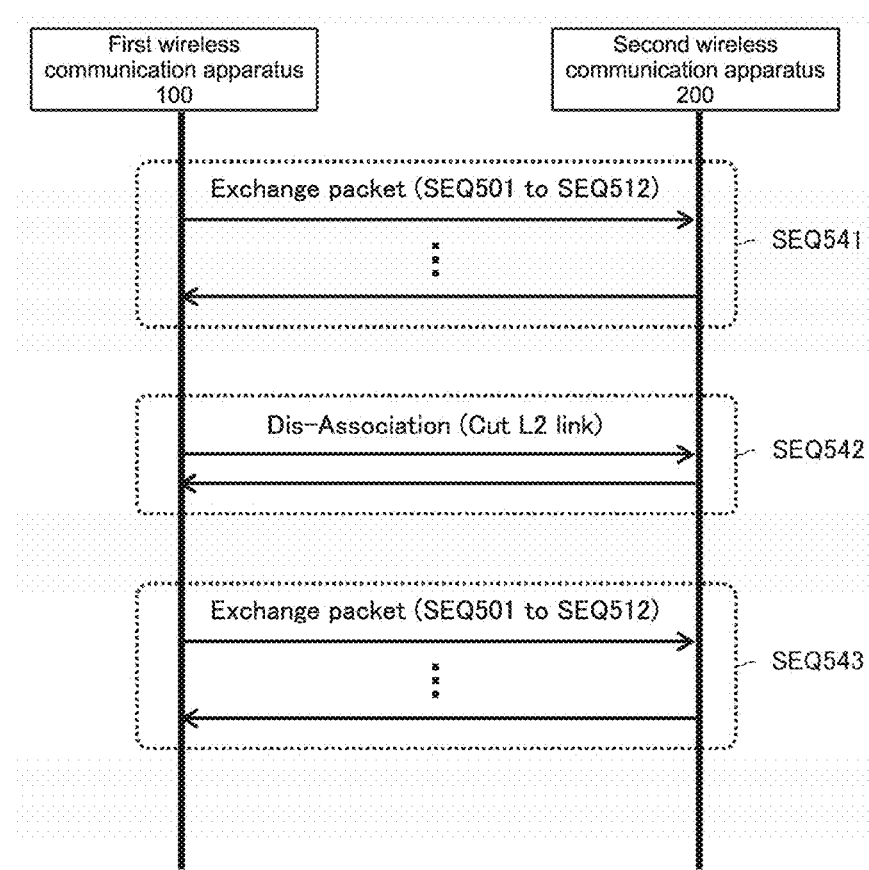
FIG. 7 is a diagram showing an example of communication processing executed between the first wireless communication apparatus 100 and the second wireless communication apparatus 200.

In FIG. 7, an example of communication processing executed between the first wireless communication apparatus 100 and the second wireless communication apparatus 200 is shown in the sequence/chart format. FIG. 7 shows an example of communication processing in the case where a particular different application is activated after connection in the second layer. Note that illustration of components in common with those in FIG. 5 and FIG. 6 is omitted. Specifically, assumption is made that in communication processing SEQ541 in FIG. 7, each processing SEQ501 to SEQ512 shown in FIG. 5 and FIG. 6 is performed. Further, assumption is made that also in communication processing SEQ543, each processing SEQ501 to SEQ512 shown in FIG. 5 and FIG. 6 is performed.

As described above, in the case where the source apparatus changes the medium setting value in response to a request from the sink apparatus with the Miracast Release1 standard, it needs to perform Device discovery, connection processing of the second layer, processing of establishing secure link, IP address assigning processing, and the like, again. Therefore, collision due to use of resources on a wireless section is increased, and user's waiting time is increased by the time necessary for the processing.

Further, in an environment in which connection is established using Wi-Fi Direct, an approach that reduces the interference wave from a different wireless apparatus as much as possible is important.

Further, a multi-source topology environment, i.e., causing a display unit of a reception-side information processing apparatus to display a plurality of images based on image data transmitted from a plurality of transmission-side information processing apparatuses is also assumed. In such a case, such band control that a data transmission rate is assigned to an information processing apparatus that needs medium display or reproduction with high quality depending on the display state as much as possible in the limited wireless band is favorable, and the band control method is an issue.

Example 1

An example in which the source apparatus changes the medium setting value in response to a request from the sink apparatus and continues data transmission as the standard extension of Miracast standard (Release1) will be described. Although a multi-source topology is assumed in the communication system 600 shown in FIG. 1, description will be made on the assumption of a single-source topology in a first example.

First, a use case and wireless environment where the source apparatus changes the medium setting value in response to the request from the sink apparatus will be described.

[Configuration Example of Communication System]

Figure 1:
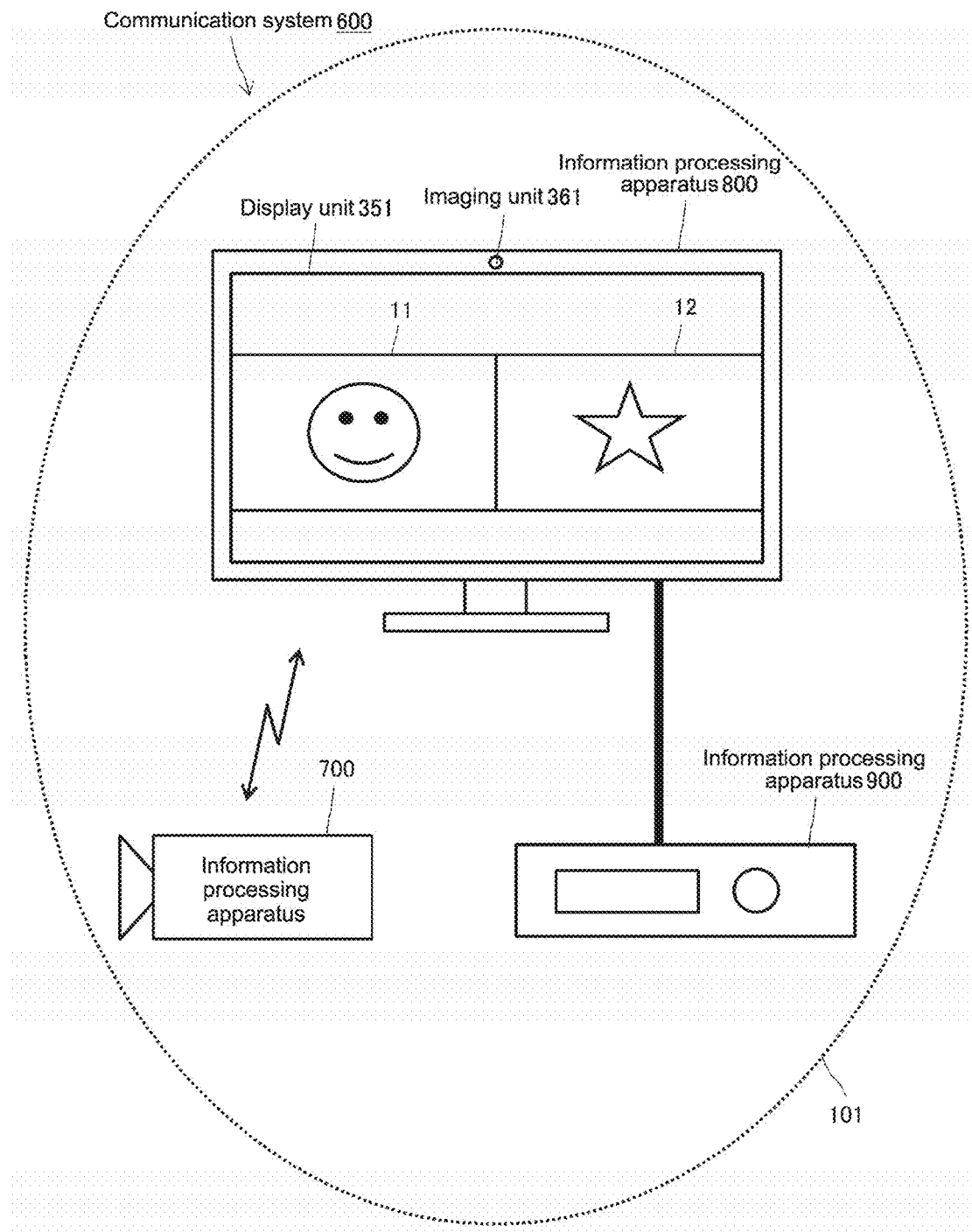
FIG. 1 is a diagram showing a configuration example of a communication system 600.

In FIG. 1, a configuration example of the communication system 600 is shown. Assumption is made that the communication system 600 shown in FIG. 1 is capable of establishing wireless connection through P2P direct connection.

The communication system 600 includes an information processing apparatus 700, an information processing apparatus 800, and an information processing apparatus 900. In the communication system 600, the information processing apparatus 800 receives data (e.g., image data and audio data) transmitted from at least one of the information processing apparatus 700 and the information processing apparatus 900. Specifically, in the communication system 600, it is assumed that wireless connection in a multi-source topology environment through P2P direct communication is performed between the information processing apparatus 700 and the information processing apparatus 900 as source apparatuses and the information processing apparatus 800 as a sink apparatus.

The information processing apparatuses 700 and 800 are each an apparatus having a wireless communication function, and the information processing apparatus 900 is an apparatus having a wired communication function for being connected to the information processing apparatus 800 through wired communication. For example, the information processing apparatuses 700 and 800 are each a display apparatus having a wireless communication function (e.g., personal computer) or a portable information processing apparatus (e.g., smartphone and tablet terminal). On the other hand, the information processing apparatus 900 is a tuner for cable television. Further, for example, the information processing apparatuses 700 and 800 are each a wireless communication apparatus conforming to IEEE802.11, IEEE802.15, IEEE802.16, and 3GPP (3rd Generation Partnership Project) specification (e.g., W-CDMA (Wideband Code Division Multiple Access), GSM (registered trademark) (Global System for Mobile Communications), WiMAX (Worldwide Interoperability for Microwave Access), WiMAX2, LTE (Long Term Evolution), and LTE-A (Advanced)). Then, the information processing apparatuses 700 and 800 are capable of transmitting/receiving various kinds of information to/from each other by using a wireless communication function.

Now, a case where wireless communication using wireless LAN is performed between the information processing apparatus 700 and the information processing apparatus 800 will be described as an example.

As wireless LAN, for example, Wi-Fi Direct, TDLS, an ad hoc network, and a meshed network can be used. Further, as short-range wireless AV transmission communication used in the communication system 600, Wi-Fi CERTIFIED Miracast (name of technical specification: Wi-Fi Display) can be used, for example. Note that Wi-Fi CERTIFIED Miracast is a mirroring technology in which audio or display video to be reproduced in one terminal is transmitted to a different terminal and the different terminal outputs the audio or video data as well, by using the technology of Wi-Fi Direct or TDLS.

Note that in the Wi-Fi CERTIFIED Miracast, a UIBC is implemented on a TCP/IP. The UIBC is a technology for transmitting the operation information of input devices such as a mouse and a keyboard from one terminal to a different terminal. Further, instead of Wi-Fi CERTIFIED Miracast, other remote desktop software (e.g., VNC (Virtual Network Computing)) may be applied.

In the Wi-Fi CERTIFIED Miracast, it is defined that an image (video) is compressed/developed with H.264, for example. Further, for example, in the Wi-Fi CERTIFIED Miracast, it is possible to adjust H.264 on the transmission side. Note that it is not limited to H.264, and H.265 (e.g., HEVC (high efficiency video coding), SHVC (scalable video coding extensions of high efficiency video coding)), MPEG (Moving Picture Experts Group) 4, and JPEG (Joint Photographic Experts Group) 7000 can be supported, for example. Further, for example, also line-based codec (e.g., Wavelet, DCT (Discrete Cosine Transform)) in which one or more lines are gathered and compressed or two or more lines are divided into 2×2 macroblocks for compression/development can be supported. Further, for example, by obtaining a difference between a particular code amount region (Picture, bundle of a plurality of lines, or macroblock, etc.) and the previous code amount region, it is possible to support also the codec in which the transmission rate is decreased without compressing DCT, Wavelet, and the like. Further, a non-compressed image (video) may be transmitted/received.

As a first example of the technology disclosed in the specification, an example in which the information processing apparatus 700 regards image data and audio data generated by an imaging operation as the transmission target is shown. Further, in the first example, an example in which the information processing apparatus 900 regards content (e.g., content containing image data and audio data) stored in a storage unit such as a hard disc as the transmission target is shown. Note that as the information processing apparatus 700, an electronic apparatus (e.g., a personal computer, a game machine, a smartphone, and a tablet terminal) on which a camera is mounted may be used. Further, as the information processing apparatus 800, a different electronic apparatus (e.g., an imaging apparatus, a game machine, a smartphone, and a tablet terminal) including a display unit may be used. Further, in the case where the information processing apparatus 700 has a tethering function, content stored in ISP (Internet Services Provider) via a wireless or wired network may be regarded as a transmission target.

For example, image data generated by an imaging operation of the information processing apparatus 700 is transmitted to the information processing apparatus 800, and an image 11 based on the image data is displayed on the display unit 351 of the information processing apparatus 800. Further, content stored in a storage unit of the information processing apparatus 900 is transmitted to the information processing apparatus 800, and an image 12 based on the content is displayed on the display unit 351 of the information processing apparatus 800.

As described above, in the first example, an example in which the information processing apparatus 700 is a source apparatus and the information processing apparatus 800 is a sink apparatus is shown.

[Configuration Example of Information Processing Apparatus (Source Apparatus)]

Figure 2:
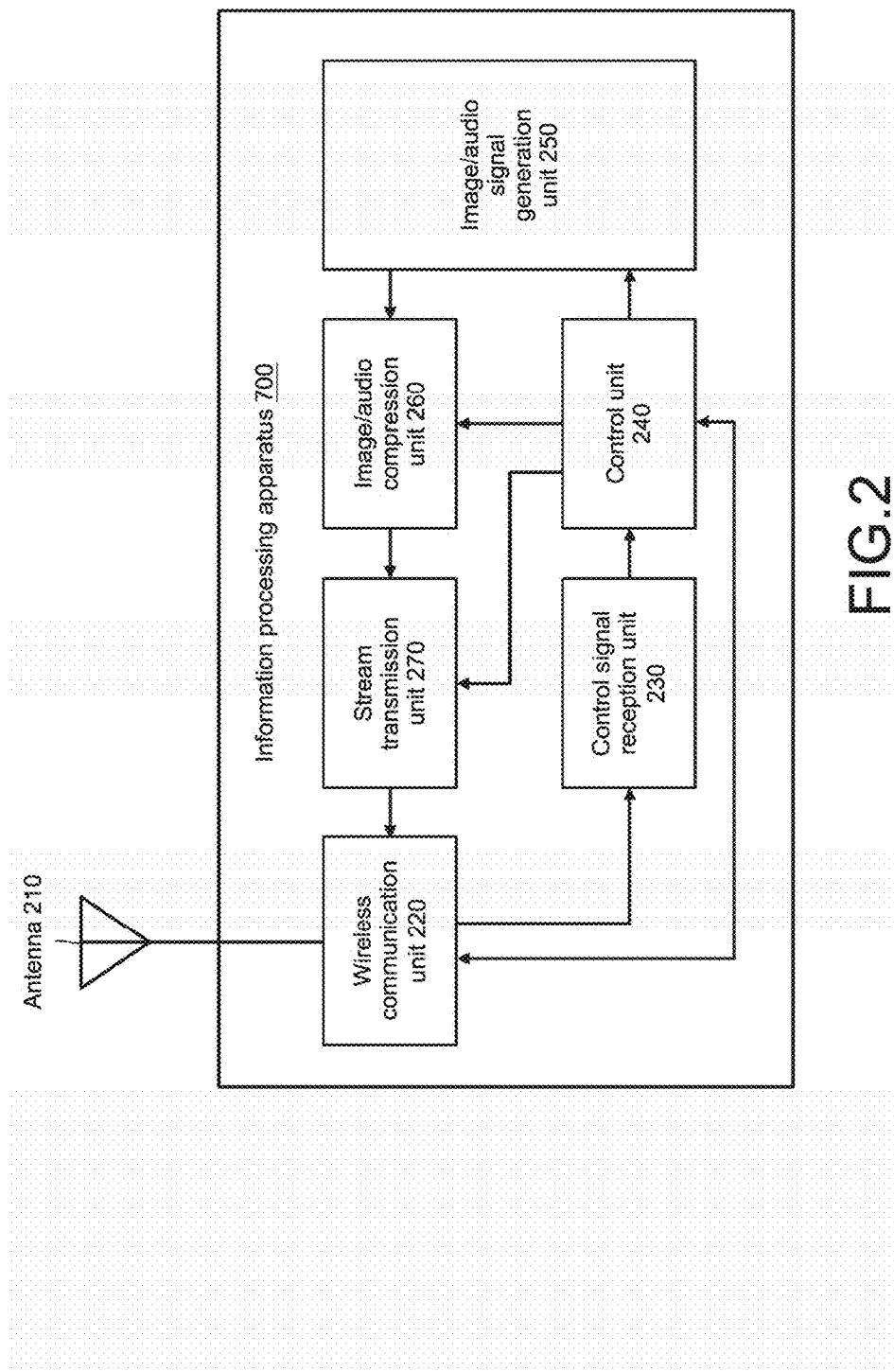
FIG. 2 is a block diagram showing a functional configuration example of an information processing apparatus 700 as a source apparatus in a first example.

In FIG. 2, a functional configuration example of the information processing apparatus 700 as the source apparatus in the first example is shown. The information processing apparatus 700 shown in FIG. 2 includes an antenna 210, a wireless communication unit 220, a control signal reception unit 230, a control unit 240, an image/audio signal generation unit 250, an image/audio compression unit 260, and a stream transmission unit 270.

The wireless communication unit 220 transmits/receives various kinds of information (e.g., image data and audio data) to/from a different information processing apparatus (e.g., the information processing apparatus 800) via the antenna 210 through wireless communication on the basis of control of the control unit 240. For example, in the case where transmission processing of image data is performed, image data generated by the image/audio signal generation unit 250 is compressed by the image/audio compression unit 260, and this compressed image data (image stream) is transmitted from the antenna 210 via the wireless communication unit 220.

Further, the wireless communication unit 220 is capable of transmitting/receiving various kinds of information to/from a different information processing apparatus (e.g., the information processing apparatus 800) by using a plurality of frequency channels. In the first example, assumption is made that the wireless communication unit 220 has a function of being capable of transmitting/receiving three kinds of frequency channels of 2.4 GHz, 5 GHz, and 60 GHz at the same time or only the selected frequency. As described above, in the case where the source apparatus has a function of being capable of transmitting/receiving a plurality of frequency channels, the sink apparatus (e.g., the information processing apparatus 800) is capable of controlling which frequency channel each source apparatus is caused to use.

The control signal reception unit 230 acquires a control signal (e.g., information on transmission/reception with the information processing apparatus 800) transmitted from a different information processing apparatus (e.g., the information processing apparatus 800) from the various kinds of information received by the wireless communication unit 220. Then, the control signal reception unit 230 outputs the acquired control signal to the control unit 240.

The control unit 240 performs control on the various kinds of information transmitted from the information processing apparatus 700. For example, the control unit 240 performs control on the image/audio signal generation unit 250 and the image/audio compression unit 260 on the basis of the control signal received by the control signal reception unit 230. Specifically, the control unit 240 performs control for changing the resolution of image data to be transmitted or the number of channel of audio, and control for changing the image region of image data to be transmitted. Specifically, the control unit 240 performs transmission control of the stream to be transmitted on the basis of the control signal received by the control signal reception unit 230. This transmission control of the stream is, for example, data transmission rate control or scalability transmission rate control.

Further, the control unit 240 may have a function of measuring radio wave propagation state (link radio wave propagation state) when transmitting/receiving data to/from the sink apparatus through wireless communication, and transmit the measuring result (radio wave propagation measuring information) to the sink apparatus.

Note that radio wave propagation measuring information is, for example, information used in determining whether or not the quality of the line with the sink apparatus is one in which image data and audio data can be transmitted/received. Further, the radio wave propagation measuring information is used in controlling stream transmission, for example. Note that instead of the radio wave propagation measuring information, it may be possible to cause the control unit 240 to count the number of times of retransmission of the same packet, and control stream transmission depending on the number of counts.

Further, the data transmission rate represents mainly a rate of occupying the communication path and includes a communication rate and communication capacity. Further, the resolution is defined as an index of image quality including elements such as an image frame (number of vertical and horizontal pixels) of image data and a bit rate (compression rate) of image data. Further, as an index of image quality, a throughput of a stream can be used. Further, the number of channels of audio includes a method of recording and reproducing audio such as monaural (1.0ch), stereo (2.0ch), 5.1 ch, 6.1ch, 9.1ch, and high-resolution (High-Resolution Audio). Further, the number of channels of audio is defined as an index of sound quality including elements such as a bit rate (compression rate) of audio data and the number of channels. Further, as the index of sound quality, a throughput of a stream can be used.

Further, the control unit 240 performs control for improving the state that cannot be stabilized by data rate control. For example, the control unit 240 has system performance information of the sink apparatus (e.g., the information processing apparatus 800) by transmitting/receiving information to/from the sink apparatus. Note that the system performance information is, for example, performance information related to the system of the sink apparatus. For example, the system performance information is a frequency channel, resolution, TCP, or UDP (User Datagram Protocol) that can be used. Further, the system performance information is, for example, information representing whether or not the encryption method, SD (Standard Definition)/HD (High Definition)/4K, and low power consumption mode are supported. For example, the control unit 240 is capable of selecting a method of controlling transmission of a stream, which further improves the stability of the entire system of the communication system 600 depending on whether or not the sink apparatus supports the low power consumption mode.

For example, the control unit 240 causes information that is transmitted/received to/from the information processing apparatus 800 to contain information on whether or not the information processing apparatus 700 is a mobile apparatus. For example, it may be possible to cause capability (Capability) information related to the information processing apparatus 700 to contain information on whether or not the information processing apparatus 700 is a mobile apparatus. On the side of the information processing apparatus 800, when the information processing apparatus 800 knows that the information processing apparatus 700 is a mobile apparatus, it is possible to determine that the information processing apparatus 700 does not to be caused to operate on the basis of the relation with another connected information processing apparatus. As described above, in the case where it is determined that the information processing apparatus 700 does not need to be caused to operate, the information processing apparatus 700 receives a transmission stopping command from the information processing apparatus 800. Then, when the control unit 240 has the transmission stopping command, it is possible to shut off the power source of respective functions of the image/audio signal generation unit 250, the image/audio compression unit 260, and the stream transmission unit 270 for a predetermined time. Further, the control unit 240 is capable of causing the wireless communication unit 220 to transfer to intermittent reception. The intermittent reception is a mode in which the wireless communication unit 220 periodically starts up to the degree that a command can be received from the information processing apparatus 800, and other than that, the power source is shut off.

The image/audio signal generation unit 250 generates data (image data, audio data) to be output on the basis of control of the control unit 240. The generated data is output to the image/audio compression unit 260. For example, the image/audio signal generation unit 250 includes an imaging unit (not shown) and an audio acquisition unit (not shown). The imaging unit (e.g., a lens, an image sensor, and a signal processing circuit) picks up an image of an object to generate image data. Further, the audio acquisition unit (e.g., a microphone) acquires surrounding audio at the time of generation of the image data. The image data and audio data generated in this way are to be transmitted to another information processing apparatus (e.g., the information processing apparatus 800).

The image/audio compression unit 260 compresses (encodes) data (image data and audio data) generated by the image/audio signal generation unit 250 on the basis of control of the control unit 240. Then, the image/audio compression unit 260 outputs the compressed data (image data and audio data) to the stream transmission unit 270. Note that the image/audio compression unit 260 may be realized by performing encoding by any one of software and hardware. Further, although the image/audio compression unit 260 is assumed to function as a codec, assumption is made that the image/audio compression unit 260 is capable of processing non-compressed image or audio. Further, assumption is made that the image/audio compression unit 260 functions also as a scalable codec. Note that the scalable codec represents, for example, a codec capable of adjusting itself depending on the resolution of a reception-side information processing apparatus (sink apparatus), a network environment, and the like.

The stream transmission unit 270 performs transmission processing of transmitting data (image data and audio data) compressed by the image/audio compression unit 260 from the antenna 210 as a stream via the wireless communication unit 220 on the basis of control of the control unit 240.

Note that although the information processing apparatus 700 can include a display unit, an audio output unit, an operation receiving unit, and the like in addition to the above-mentioned respective units, illustration thereof is omitted in FIG. 2.

The display unit (not shown) of the information processing apparatus 700 is, for example, a display unit that displays an image generated by the image/audio signal generation unit 250. Note that various display panels can be used as the display unit. For example, an organic EL (Electro Luminescence), crystal LED (Light Emitting Diode) display (Crystal LED Display), and LCD (Liquid Crystal Display) can be used.

The audio output unit (not shown) of the information processing apparatus 700 is, for example, an audio output unit (e.g., speaker) that outputs audio generated by the image/audio signal generation unit 250. Note that although an image can be output from both of a transmitter and a receiver, it is favorable to output audio from only one of them.

The operation receiving unit (not shown) of the information processing apparatus 700 is an operation receiving unit that receives an operation input performed by a user, and is, for example, a keyboard, a mouse, a game pad, a touch panel, a camera, or a microphone. Note that the operation receiving unit and the display unit can be integrally formed by using a touch panel on which a user is capable of performing an operation input by causing the finger to be in contact with or come close to the display surface.

Further, although an example in which the information processing apparatus 700 generates image data and audio data to be transmitted is shown in FIG. 2, the information processing apparatus 700 may acquire, from an external apparatus, image data and audio data to be transmitted. For example, the information processing apparatus 700 may acquire, from a Web camera with a microphone, image data and audio data to be transmitted. Further, the information processing apparatus 700 may regard, as the transmission target, content (e.g., content containing image data and audio data) stored in a storage apparatus such as a hard disc located inside or outside the information processing apparatus 700. In this case, a case where the content stored in the storage apparatus is compressed content is also assumed. In this case, in the case where the compression method of the compressed content is an encoding method defined in the standard employed by the communication system 600, the compressed content may be transmitted as it is without decoding.

[Configuration Example of Information Processing Apparatus (Sink Apparatus)]

Figure 3:
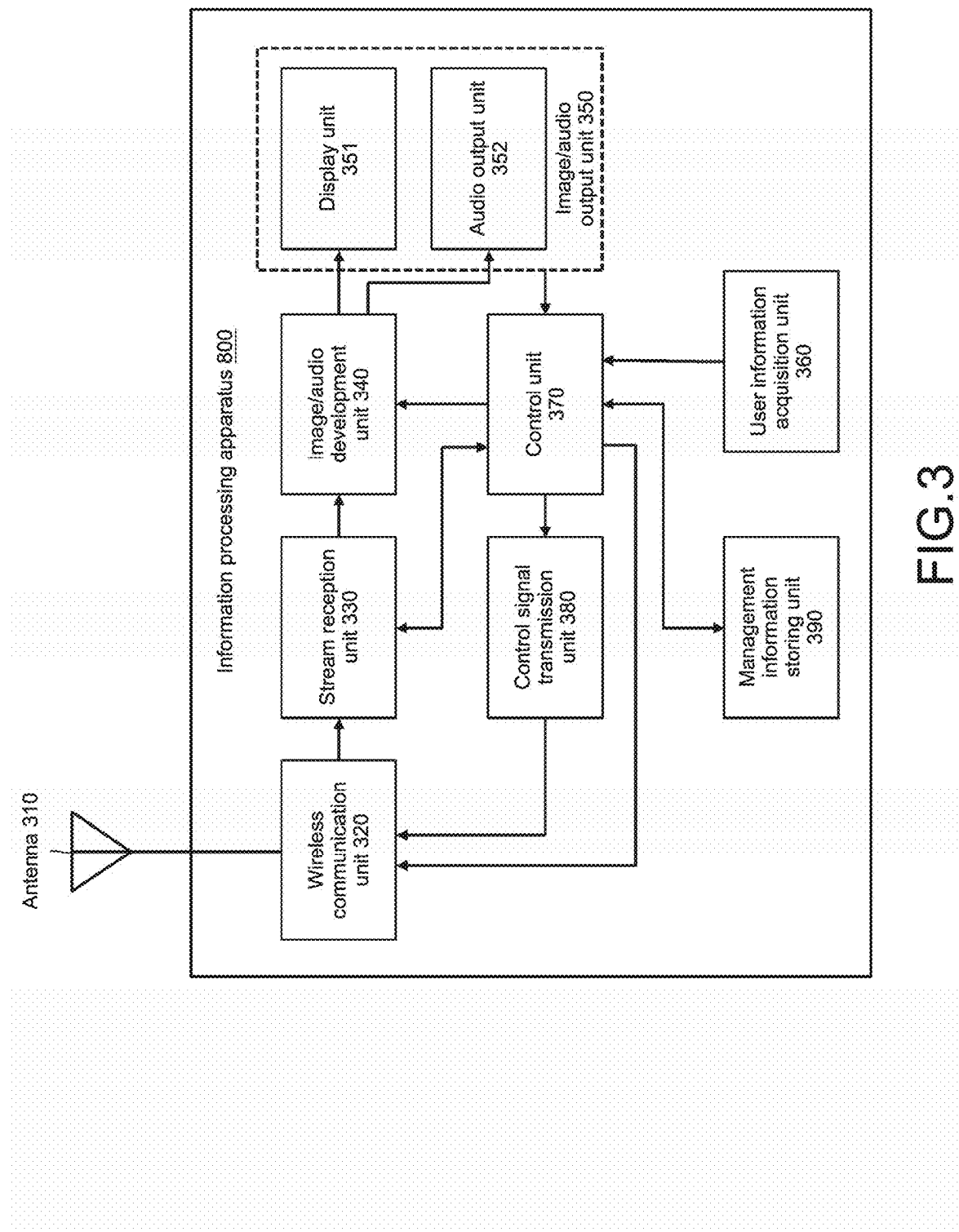
FIG. 3 is a block diagram showing a functional configuration example of an information processing apparatus 800 as a sink apparatus in the first example.

In FIG. 3, a functional configuration example of the information processing apparatus 800 as a sink apparatus in the first example is shown. The information processing apparatus 800 shown in FIG. 3 includes an antenna 310, a wireless communication unit 320, a stream reception unit 330, an image/audio development unit 340, an image/audio output unit 350, a user information acquisition unit 360, a control unit 370, a control signal transmission unit 380, and a management information storing unit 390.

The wireless communication unit 320 transmits/receives various kinds of information (e.g., image data and audio data) to/from a different information processing apparatus (e.g., the information processing apparatus 700) via the antenna 310 through wireless communication on the basis of control of the control unit 370. For example, in the case where reception processing of image data is performed, image data received by the antenna 310 is developed (decoded) by the image/audio development unit 340 via the wireless communication unit 320 and the stream reception unit 330. Then, the developed image data is supplied to the image/audio output unit 350, and an image depending on the developed image data is output from the image/audio output unit 350. Specifically, an image depending on the developed image data is displayed on the display unit 351.

Further, the wireless communication unit 320 is capable of transmitting/receiving various kinds of information to/from a different information processing apparatus (e.g., information processing apparatus 700) by using a plurality of frequency channels. In the first example, assumption is made that the wireless communication unit 320 has a function of being capable of transmitting/receiving three kinds of frequency channels of 2.4 GHz, 5 GHz, and 60 GHz at the same time or only the selected frequency. Specifically, the wireless communication unit 320 is capable of performing communication using a first frequency band and communication using a second frequency band of a data transmission rate higher than the first frequency band. Further, the control unit 370 controls which of a plurality of frequency channels is used for wireless communication with each source apparatus.

Note that the link between the information processing apparatus 700 and the information processing apparatus 800 and the link between the information processing apparatus 900 and the information processing apparatus 800 may be the same frequency channel or different frequency channel.

Further, although an example in which the wireless communication unit 320 has a function of being capable of transmitting/receiving three kinds of frequency channels of 2.4 GHz, 5 GHz, and 60 GHz at the same time or only the selected frequency is shown in the first example, the technology disclosed in the specification is not limited thereto. For example, the wireless communication unit 320 may have a function of being capable of transmitting/receiving another frequency channel, or two or four or more frequency channels.

The stream reception unit 330 receives information on transmission/reception with each source apparatus and a stream (e.g., image stream, audio stream) out of the various kinds of information received by the wireless communication unit 320 on the basis of control of the control unit 370. Then, the stream reception unit 330 outputs the received RTSP message information to the control unit 370, and the received stream to the image/audio development unit 340 and the control unit 370.

Note that the information on transmission/reception with each source apparatus is information transmitted from the source apparatus (e.g., the information processing apparatus 700), and includes an acquisition request for system performance information of the information processing apparatus 800, for example. This system performance information is, for example, information representing a frequency channel that can be used, resolution, TCP, UDP, or whether or not the encryption method, SD/HD/4K, and low power consumption mode are supported.

Further, the stream reception unit 330 has a function of measuring the radio wave propagation state (link radio wave propagation state) when transmitting/receiving data to/from the sink apparatus through wireless communication. Then, the stream reception unit 330 transmits the measuring result (radio wave propagation measuring information) to the control unit 370.

The image/audio development unit 340 develops (decodes) a stream (image data and audio data) transmitted from a different information processing apparatus (e.g., the information processing apparatus 700) on the basis of control of the control unit 370. Then, the image/audio development unit 340 outputs the developed data (image data and audio data) to the image/audio output unit 350. Note that the image/audio development unit 340 may be realized by performing decoding by any one of software and hardware. Further, although the image/audio development unit 340 is assumed to function as a codec, assumption is made that the image/audio development unit 340 is capable of processing non-compressed image or audio. Further, assumption is made that the image/audio development unit 340 functions also as a scalable codec.

The image/audio output unit 350 includes the display unit 351 and an audio output unit 352.

The display unit 351 displays each image based on image data developed by the image/audio development unit 340. Note that as the display unit 351, a display panel such as an organic EL panel, a crystal LED display, and an LCD panel can be used. Further, as the display unit 351, a touch panel on which a user is capable of performing an operation input by causing the finger to be in contact with or come close to the display surface may be used.

The audio output unit 352 is an audio output unit (e.g., speaker) that outputs various kinds of audio (audio related to the image displayed on the display unit 351, etc.) based on audio data developed by the image/audio development unit 340. Note that as the method of outputting audio, a method of reproducing only audio of the source apparatus assigned to the center channel (main image) from the speaker and not reproducing audio of the source apparatus assigned to a peripheral channel (sub-image) can be used, for example. Further, as another method of outputting audio, a method of using mainly the sound volume of audio of the source apparatus assigned to the center channel and reproducing audio of the source apparatus assigned to a peripheral channel with reduced sound volume can be used, for example. Note that another method of outputting audio other than these methods may be used.

The user information acquisition unit 360 acquires information related to a user (user information). The acquired user information is output to the control unit 370. For example, the user information acquisition unit 360 is capable of acquiring the user information by receiving the input from an operation receiving unit (a keyboard, a mouse, a remote controller, a game pad, a touch panel) on which the user is capable of directly setting the display method. Note that the operation receiving unit is, for example, an operation member for designating an arbitrary region in the image displayed on the display unit 351. Further, for example, the user information acquisition unit 360 is capable of acquiring the user information by receiving the input from a device that is capable of grasping a user's intention, such as a camera, a microphone, and various sensors (e.g., a gyro sensor and a sensor that detects a human body).

For example, the user information acquisition unit 360 acquires the user information generated by a user's operation when information based on a stream received from a different information processing apparatus (e.g., the information processing apparatus 700) through wireless communication is output from the image/audio output unit 350. This user information is generated by a user's operation related to the image displayed on the display unit 351, for example. For example, the user information is information generated on the basis of a user's operation related to the image displayed on the display unit 351.

For example, the user information acquisition unit 360 is capable of acquiring image data generated by an imaging unit (omitted) attached to the display unit to generate the user information. Further, for example, the user information acquisition unit 360 may acquire information (e.g., location information, identification information) acquired by an external apparatus (e.g., various sensors, wearable device) to generate the user information.

The control unit 370 causes the management information storing unit 390 to store various kinds of information acquired by the stream reception unit 330, and manages each source apparatus on the basis of management information stored in the management information storing unit 390. Further, the control unit 370 controls transmission of a stream so that the stability of streams transmitted from a plurality of source apparatuses is improved in the entire system.

For example, the control unit 370 controls transmission of a stream on the basis of the user information acquired by the user information acquisition unit 360 and the management information stored in the management information storing unit 390. Specifically, the control unit 370 generates a control signal for controlling transmission of a stream for each source apparatus on the basis of the management information stored in the management information storing unit 390. Then, the control unit 370 outputs the generated control signal to the control signal transmission unit 380. For example, the control unit 370 generates a control signal for changing the resolution of the image displayed on the display unit 351 on the basis of the user information and the management information and requesting for the transmission rate equivalent to the resolution for each source apparatus. Further, the control unit 370 generates a control signal for determining the display region of the image in the display unit 351 on the basis of the user information and the management information. Further, for example, the control unit 370 generates a control signal for determining the size of the image in the display unit 351 on the basis of the user information and the management information.

Further, the control unit 370 performs control for setting the frequency channel and resolution to be used on the basis of the user information and the management information. For example, the control unit 370 sets the frequency channel to be used for each source apparatus from the plurality of frequency channels of the wireless communication unit 320. Further, in the case where the power consumption mode is different for each frequency channel, the control unit 370 grasps the respective modes and is capable of setting the frequency channel caring the power consumption of the mobile apparatus. Specifically, the control unit 370 is capable of separately setting a first power consumption mode related to the first frequency band and a second power consumption mode related to the second frequency band of a data transmission rate higher than the first frequency band.

The control signal transmission unit 380 performs transmission processing of transmitting, to a different wireless communication apparatus, the control signal output from the control unit 370 via the wireless communication unit 320 and the antenna 310.

[Transition Example of Screen]

In FIG. 4, a transition example of an image displayed on the display unit 351 of the information processing apparatus 800 according to the first example is shown.

Figure 4A:
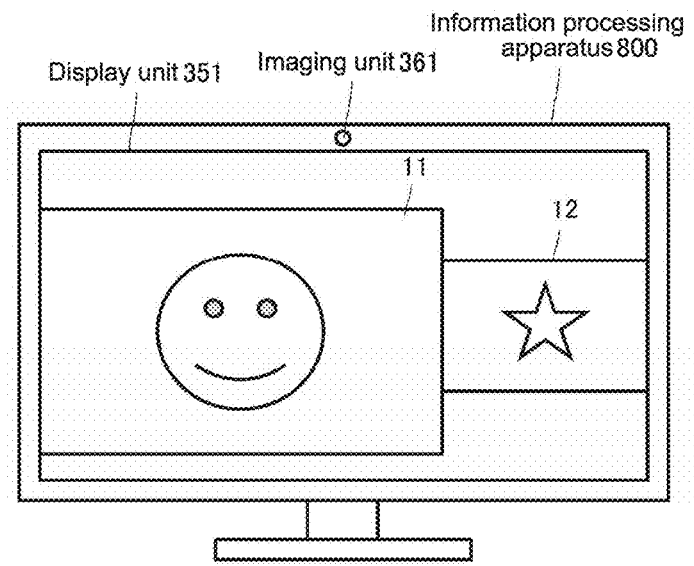
FIG. 4A is a diagram showing a transition example of an image displayed on a display unit 351 of the information processing apparatus 800.

In FIG. 4A, an example of the display format in which the image 11 received from the information processing apparatus 700 and the image 12 received from the information processing apparatus 900 are displayed on the display unit 351 of the information processing apparatus 800 so that the center channel is the image 11 and a peripheral channel is the image 12 is shown.

Figure 4B:
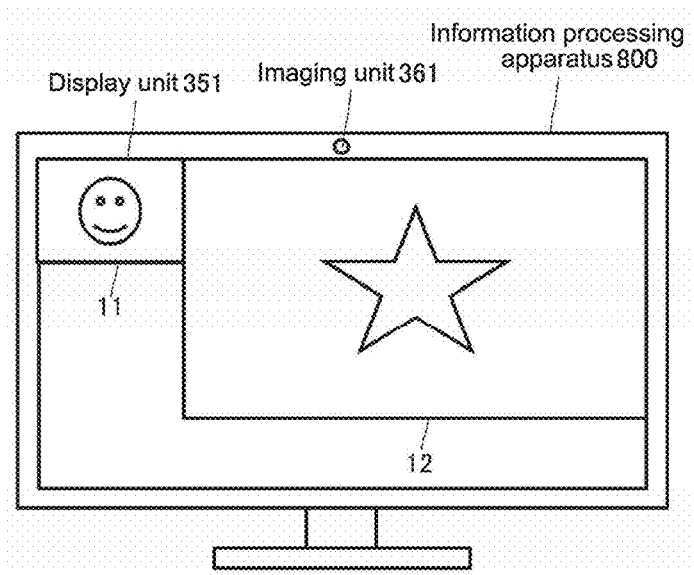
FIG. 4B is a diagram showing a transition example of an image displayed on the display unit 351 of the information processing apparatus 800.

Further, in FIG. 4B, an example of the display format in which the image 11 received from the information processing apparatus 700 and the image 12 received from the information processing apparatus 900 are displayed on the display unit 351 of the information processing apparatus 800 so that the peripheral channel is the image 11 and the center channel is the image 12 is shown.

For example, assumption is made that the information processing apparatus 700 and the information processing apparatus 900 transmit streams (image data and audio data) with a standard resolution to the information processing apparatus 800. In this case, as shown in FIG. 1, it is possible to display the image 11 based on the image data from the information processing apparatus 700 and the image 12 based on the image data from the information processing apparatus 900 on the display unit 351 of the information processing apparatus 800 so that the sizes of the images are the same. Note that although it is defined that the given resolution and display region are the same in this example, it may be possible to add a scaler function to the display unit 351 and display the image 11 and the image 12 on the display unit 351 after rescaling the images. Note that description will be simply made here on the assumption that the scaler function is not used.

Further, regarding the display format of the image 11 and the image 12, for example, it may be possible to store the display format set in the previous communication and display the image 11 and the image 12 on the display unit 351 of the information processing apparatus 800 in accordance with the stored display format.

Further, it may be possible to determine the display format of the image 11 and the image 12 on the basis of the order of connection to the information processing apparatus 800. For example, assumption is made that the information processing apparatus 700 is connected to the information processing apparatus 800 first, and the information processing apparatus 900 is connected to the information processing apparatus 800 after the connection. In this case, the image 11 and the image 12 are displayed on the display unit 351 of the information processing apparatus 800 so that the center channel is the image 11 and the peripheral channel is the image 12. Specifically, it may be possible to display images in the order of the center channel and then the peripheral channel on the basis of the order of connection to the information processing apparatus 800.

Further, as shown in FIG. 4A, a case where the user information in which the center channel is the image 12 is acquired by the user information acquisition unit 360 when the image 11 and the image 12 are displayed on the display unit 351 so that the center channel is the image 11 and the peripheral channel is the image 12 is assumed. For example, a viewer performs an operation of making the center channel the image 12 by using a pointer such as a remote controller and a gesture, and thus, the user information in which the center channel is the image 12 is acquired by the user information acquisition unit 360. In this case, as shown in FIG. 4B, the center channel and the peripheral channel are respectively switched to the image 12 and the image 11, and the image 11 and the image 12 are displayed on the display unit 351. Further, also the display positions of the image 11 and the image 12 on the display surface of the display unit 351 are determined on the basis of the user information (e.g., manual operation, line of sight) acquired by the user information acquisition unit 360.

As described above, depending on the display form of the information processing apparatus 800 (sink apparatus), a medium setting value (a resolution, an image compression method, an audio compression method, a video or audio output format, etc.) transmitted by the information processing apparatus 700 (source apparatus) may be changed.

In this regard, the function of the Miracast Release1 standard is extended, and operation processing of promptly changing a medium setting value of the source apparatus depending on the size of the screen displayed by the sink apparatus and controlling the transmission rate of transmission data in the display form such as that shown in FIG. 4B will be described below.

Figure 8:
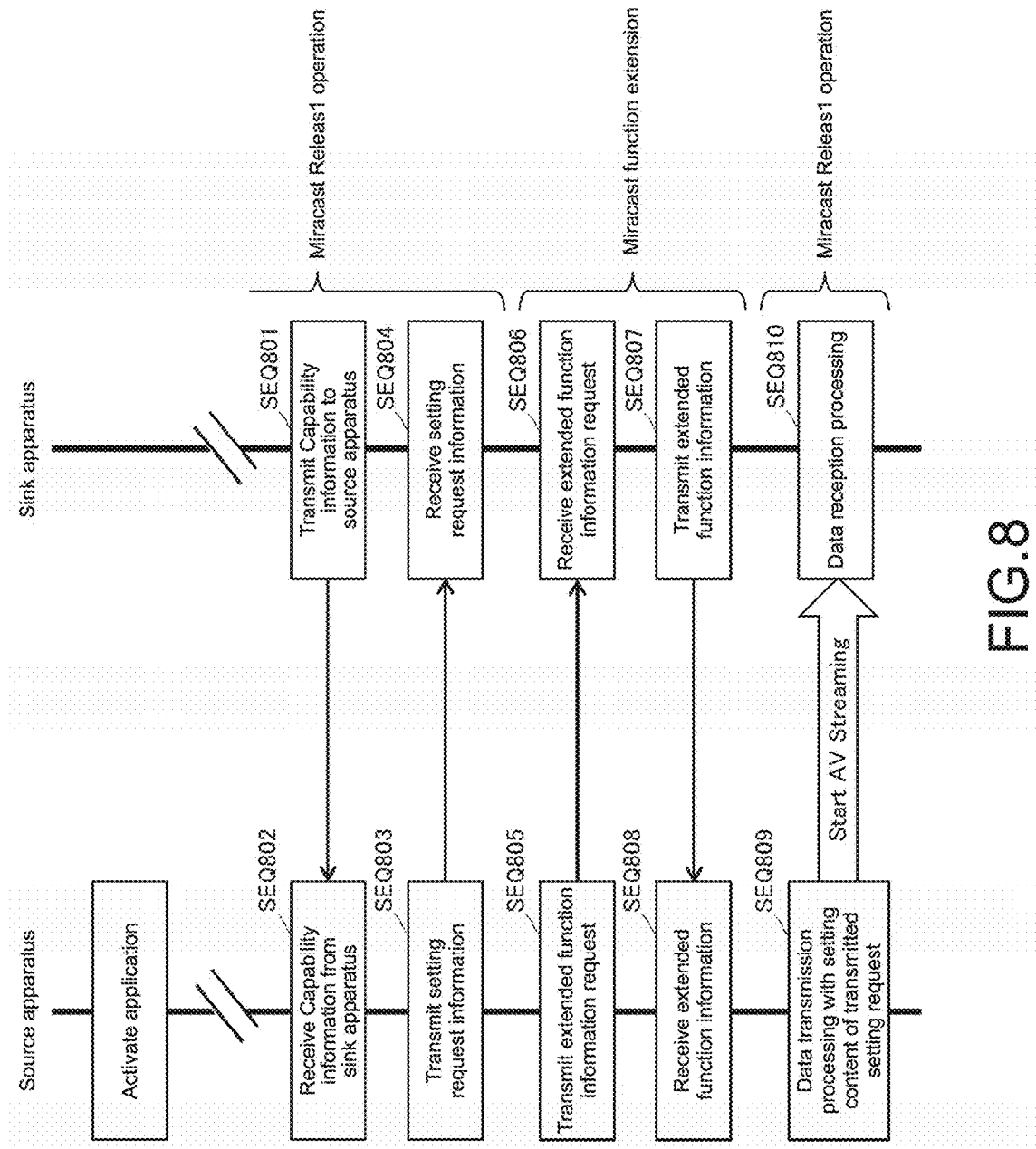
FIG. 8 is a diagram showing an example of a communication sequence (before AV transmission) for checking whether or not the extended function of the Miracast Release1 standard is implemented between the source apparatus and the sink apparatus.

First, it needs to confirm whether or not the source apparatus and the sink apparatus implement the present extended function. In this regard, a communication sequence (before AV transmission) for checking the presence or absence of implementation of the above-mentioned extended function of the Miracast Release1 standard between the source apparatus and the sink apparatus will be described with reference to FIG. 8. Note that in FIG. 8, illustration of communication processing from SEQ501 to L4 SetUp in SEQ510 shown in FIG. 5 and FIG. 6 is omitted, and communication processing in the environment where the RTSP link is connected between the source apparatus and the sink apparatus is shown.

The sink apparatus transmits its own Capability information to the source apparatus (SEQ801). When receiving the Capability information from the sink apparatus (SEQ802), the source apparatus transmits setting request information to the sink apparatus (SEQ803). The sink apparatus receives the setting request information from the source apparatus (SEQ804).

Note that the processing from SEQ801 to SEQ804 is Capability Negotiation processing in the Miracast Release1, and corresponds to the RTSP message such as Get_Parameter Request and Get_Parameter Response. Among them, SEQ803 and SEQ804 respectively correspond to RTSP M4 Request and Respopnse message in the process M4 of Capability Negotiation processing. The setting request information received by the sink apparatus in this process M4 contains the resolution information related to the image data transmitted from the source apparatus to the sink apparatus.

The source apparatus has a function of making an inquiry to the sink apparatus about whether or not the sink apparatus has a function of making a setting request to the source apparatus on the initiative of the sink apparatus when exchanging Capability Negotiation. Specifically, the source apparatus transmits an extended function information request to the sink apparatus (SEQ805). When receiving the extended function information request from the source apparatus (SEQ806), the sink apparatus transmits extended function information to the source apparatus (SEQ807). The source apparatus receives the extended function information from the sink apparatus (SEQ808). As a specific example of the RTSP message, the source apparatus transmits an indication that requests for the extended function information to the sink apparatus as GET_Parameter Request, and the sink apparatus sends back whether or not the extended function information is implemented as Get_Parameter Response. The processing from SEQ805 to SEQ808 is the Miracast extended function.

After that, the source apparatus performs AV data transmission processing with the setting content of the setting request transmitted in SEQ803 (SEQ809), and AV streaming as the Miracast Release1 operation is started. Then, the sink apparatus performs data reception processing of an AV stream (SEQ810).

Note that the order of the exchange from "transmit the extended function information request" in SEQ805 to "receive the extended function information" in SEQ808 is not limited to that shown in FIG. 8. For example, although the exchange in which the source apparatus requests for the Capability information of the sink apparatus and the sink apparatus sends back the Capability information is performed, the exchange from "transmit the extended function information request" to "receive the extended function information" may be performed at the same time with the exchange in which the source apparatus makes a request for the Capability information to the sink apparatus and the sink apparatus sends back the Capability information or before the exchange of the Capability information.

Next, an example (after AV transmission) in which the source apparatus changes a medium setting value in response to a request from the sink apparatus by using an RTSP message will be described with reference to FIG. 9.

Figure 9:
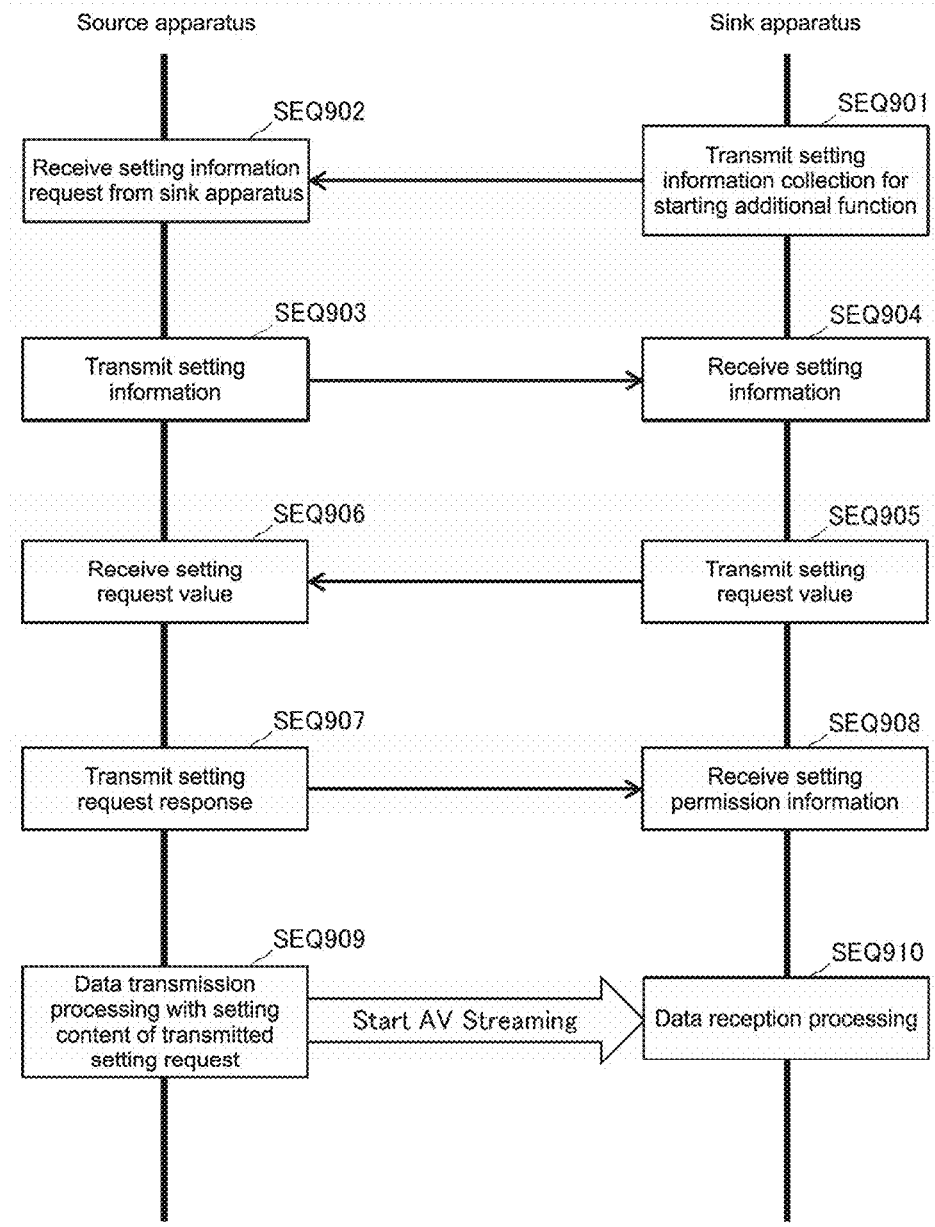
FIG. 9 is a diagram showing an example of a communication sequence (after AV transmission) in which the source apparatus changes a medium setting value in response to a request from the sink apparatus.

The exchange shown in FIG. 9 is started as the processing of extending the Miracast function after the setting request change event to the source apparatus of Miracast occurs in the sink apparatus.

The sink apparatus transmits setting information collection for starting an additional function to the source apparatus (SEQ901). When receiving the setting information request from the sink apparatus (SEQ902), the source apparatus transmits setting information to the sink apparatus (SEQ903). The sink apparatus receives the setting information from the source apparatus (SEQ904). Specifically, the sink apparatus transmits GET_Parameter to the source apparatus, and receives Response from the source apparatus. At that time, the sink apparatus is capable of having the Capability information that the source apparatus is capable of transmitting.

Then, the sink apparatus selects a setting request value on the basis of the received setting information, and transmits it to the source apparatus (SEQ905). When receiving the setting request value (SEQ906), the source apparatus transmits a setting request response to the sink apparatus (SEQ907). The sink apparatus receives setting permission information from the source apparatus (SEQ908). Specifically, the sink apparatus selects one piece of information from the Capability information that the source apparatus is capable of transmitting, selects the selected medium setting value, calls Set_Parameter with an RTSP message, and makes a request for a setting change to the source apparatus. The sink apparatus takes into account the resolution information related to communication between the sink apparatus itself and the source apparatus and how the sink apparatus itself is used in addition to the Capability information on the side of the source apparatus, when selecting the medium setting value.

After the source apparatus receives the setting change, the exchange between the source apparatus and the sink apparatus is the operation equivalent to Miracast Release1. The source apparatus performs AV data transmission processing with the setting content of the setting request transmitted in SEQ906 (SEQ909), and AV streaming as the Miracast Release1 operation is started. Then, the sink apparatus performs data reception processing of an AV stream (SEQ910).

Note that although the medium setting value (e.g., resolution) is reduced to one on the side of the sink apparatus and notified to the source apparatus when the sink apparatus requests the source apparatus to change the medium setting value of the source apparatus in the example shown in FIG. 9, the technology disclosed in the specification is not limited thereto. For example, regarding the medium setting value sent back from the sink apparatus, the sink apparatus may notify the source side of a group of all medium setting values that are requested to be set and a medium setting value may be selected from the notified medium setting value group on the side of the source apparatus.

Next, an example of the RTSP message for extending the function of the Miracast Release1 will be described. With the same RTSP message, a change of the resolution or a change of the bit rate is added to the source apparatus on the initiative of the sink apparatus. The details of this RTSP message for function extension are as the following (1) to (4).

(1) Checking of Presence or Absence of RTSP Message Function on Initiative of Sink Apparatus Whether or not the sink apparatus has a function of transmitting GET_Parameter Request is checked.

(2) Dynamic Bit Rate Change on Initiative of Sink Apparatus

The sink apparatus dynamically checks and sets the bit rate function of the source apparatus.

(3) Dynamic Resolution Change on Initiative of Sink Apparatus

The sink apparatus dynamically checks and sets the resolution change of the source apparatus.

(4) Checking and Setting of Refresh Rate Function on Initiative of Sink Apparatus The sink apparatus dynamically checks and sets the refresh rate function.

TABLE 1

| No. | Command name (tentative) | Command overview |
|---|---|---|
| (1) | ext_cmd_20 | Whether or not the sink apparatus has a function of transmitting Get_Parameter Request is checked |
| (2) | ext_cmd_21 | The sink apparatus checks and sets the dynamic bit rate function. In the case where the bit rate is changed, the value relative to the present value is described in units of % following ext_cmd 21:. Note that in the case where the maximum bit rate is desired to be designated, the maximum bit rate is subsequently described in units of kbps. |
| (3) | ext_cmd_22 | The sink apparatus checks and sets the dynamic resolution change function. In the case where the resolution is changed, the resolution that is desired to be designated is described in the same syntax as that of wfd_video_formats following ext_cmd 22:. Further, in the case where the source apparatus receives the resolution change request, RSTP OK is sent back before av-format-change is transmitted to the sink apparatus to add the change timing. |
| (4) | ext_cmd_23 | The sink apparatus checks and sets the dynamic refresh rate function. In the case where the refresh rate is changed, the maximum refresh rate is described in units of fps following ext_cmd 23:. |

Figure 10:
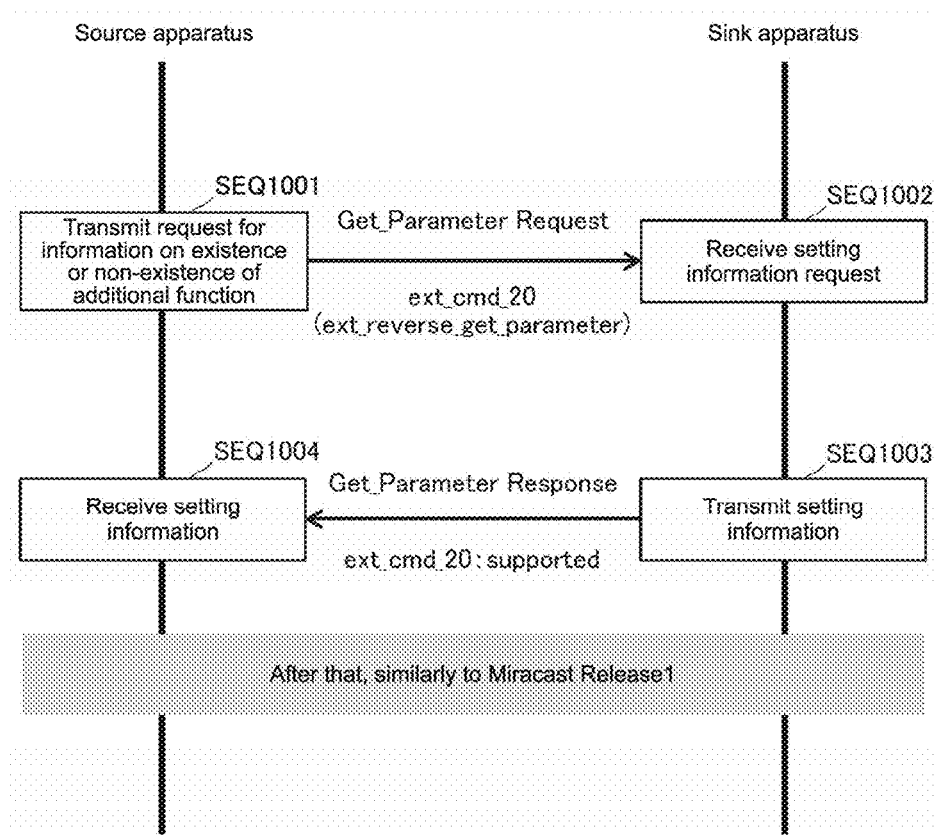
FIG. 10 is a diagram showing an example of a communication sequence using an extended RTSP message between the source apparatus and the sink apparatus.

In FIG. 10, an example of a communication sequence (before AV transmission) using the above-mentioned extended RTSP message between the source apparatus and the sink apparatus is shown.

The source apparatus transmits GET_Parameter Request that indicates requesting for information on existence or non-existence of an additional function by using the above-mentioned command ext_cmd_20 (SEQ1001).

When receiving the setting information request from the source apparatus (SEQ1002), the sink apparatus sends back Get_Parameter Response containing the setting information with the above-mentioned command ext_cmd_20 (SEQ1003).

When the source apparatus receives the setting information from the sink apparatus (SEQ1004), a similar communication operation to that of Miracast Release1 is performed after that.

In SEQ1001, the source apparatus transmits a new RTSP parameter ext_reverse_get_parameter by GET_Parameter Request. This parameter ext_reverse_get_parameter is defined as follows in the ABNF (Augmented Backus-Naur form) syntax.

ext_reverse_get_parameter="ext_reverse_get_parameter:"
SP stream-control CRLF stream-
control="none"/"supported"; "none" if not supported [Math. 1]

The source apparatus that supports this function transmits an RTSP M3 request message containing wfd_audio_stream_control, and makes an inquiry to the sink apparatus about this function is supported on the side of the sink apparatus. Because the sink apparatus that does not support this function sends back "none" by an RTSP M3 Response message, after that, the source apparatus does not use this function. The sink apparatus that supports this function sets the supportable bit to 1, and notifies the source apparatus of it by an RTSP M3 Response message.

Figures 20, 21:
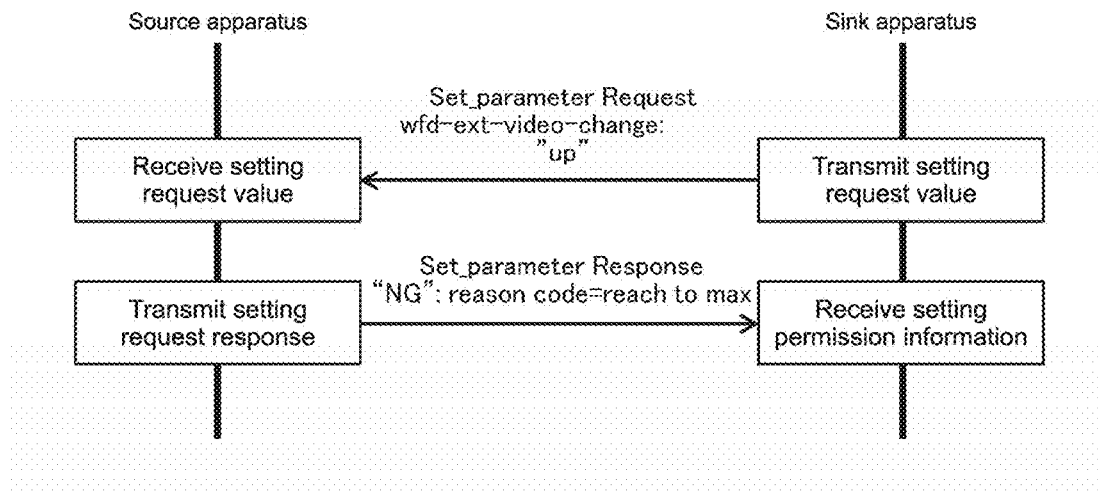
FIG. 20 is a diagram showing an example of a communication sequence of an RTSP message for the source apparatus to change a medium setting value in response to a request from the sink apparatus.
FIG. 21 is a diagram showing an example of an RTSP M3 Request message.

In FIG. 21, an example of the RTSP M3 Request message transmitted from the source apparatus to the sink apparatus is shown. This RTSP M3 Request message is different from the existing RTSP M3 Request message in that the content length (Content-Length) is designated to be 168 and it contains the parameter ext_reverse_get_parameter.

Further, in FIG. 22, an example of the RTSP M3 Response message transmitted from the sink apparatus to the source apparatus is shown. This RTSP M3 Response message is different from the existing RTSP M3 Request message in that the content length (Content-Length) is designated to be 328 and it contains the parameter ext_reverse_get_parameter.

Note that in this example, a method of using GET_Parameter in which whether or not the sink apparatus has a function of transmitting GET_Parameter_Request is checked in M3 GET_PARAMETER Response to minimize the change in the sequence of exchanging the RTSP message of Miracast release-1 is employed. This method is different from the original one. As long as the change in the sequence of the RTSP message exchange is permitted, e.g., in the subsequent standard or original implementation, a method in which the M3R Request/Rresponse message or M4R Request/Response message obtained by reversing the transmission direction of the existing M3 Request/Response message or M4 Request/Response message is defined and notification of the Capability information between the source apparatus and the sink apparatus or parameter setting (change in the medium setting value) is performed by using them is also possible.

In the M3 GET_PARAMETER or M4 SET_PARAMETER, Request is transmitted from the source apparatus to the sink apparatus in the original standard. On the other hand, the M3R Request/Rresponse message or M4R Request/Response message to which a suffix that represents a reverse direction (reverse) is added is a message that is newly defined to transmit a parameter in the reverse direction. In FIG. 23, an example of the RTSP M3R Request message transmitted from the sink apparatus to the source apparatus is shown. Further, in FIG. 24, an example of the RTSP M3R Response message transmitted from the source apparatus to the sink apparatus is shown.

Figure 25:
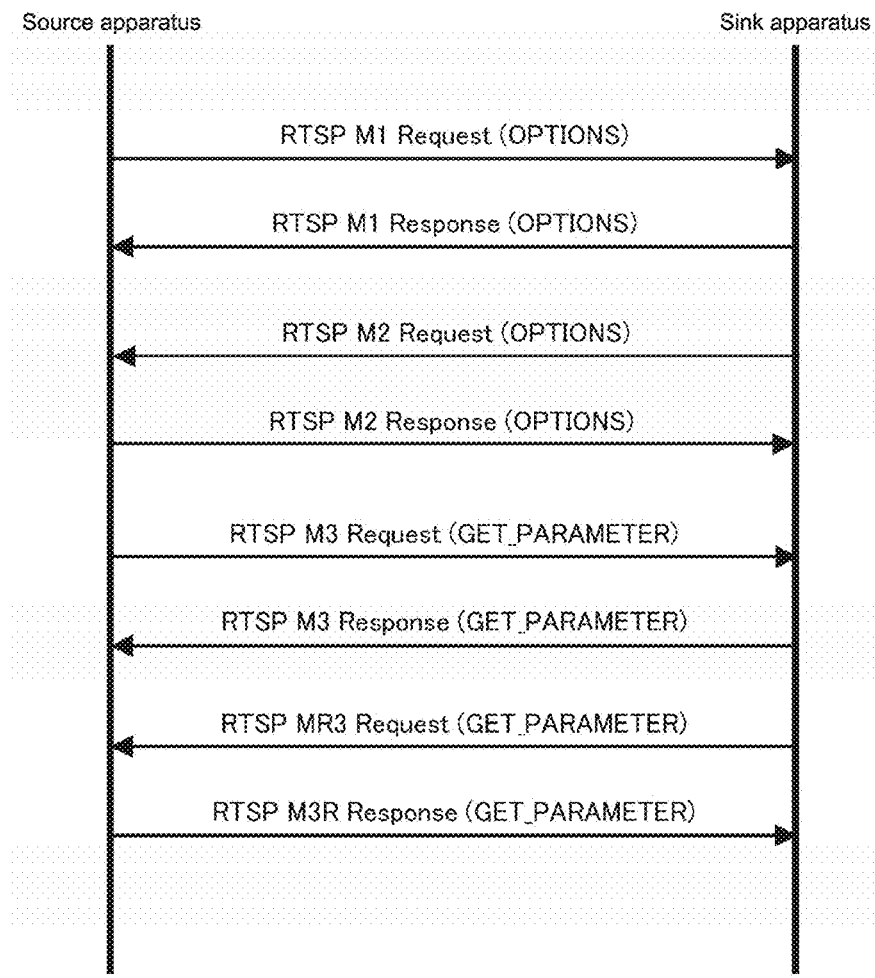
FIG. 25 is a diagram showing an example of a communication sequence of an RTSP message using a newly defined M3R Request/Rresponse message.

An example of a communication sequence of the RTSP message using the newly defined M3R Request/Rresponse message is shown in FIG. 25. It is understood that in the case where the source apparatus sends back "Supported" to the sink apparatus by the processing of the M3R Request/Rresponse message, the communication sequence (after AV transmission) of the additional RTSP message shown in FIG. 11, for example, is continuously performed.

Figure 11:
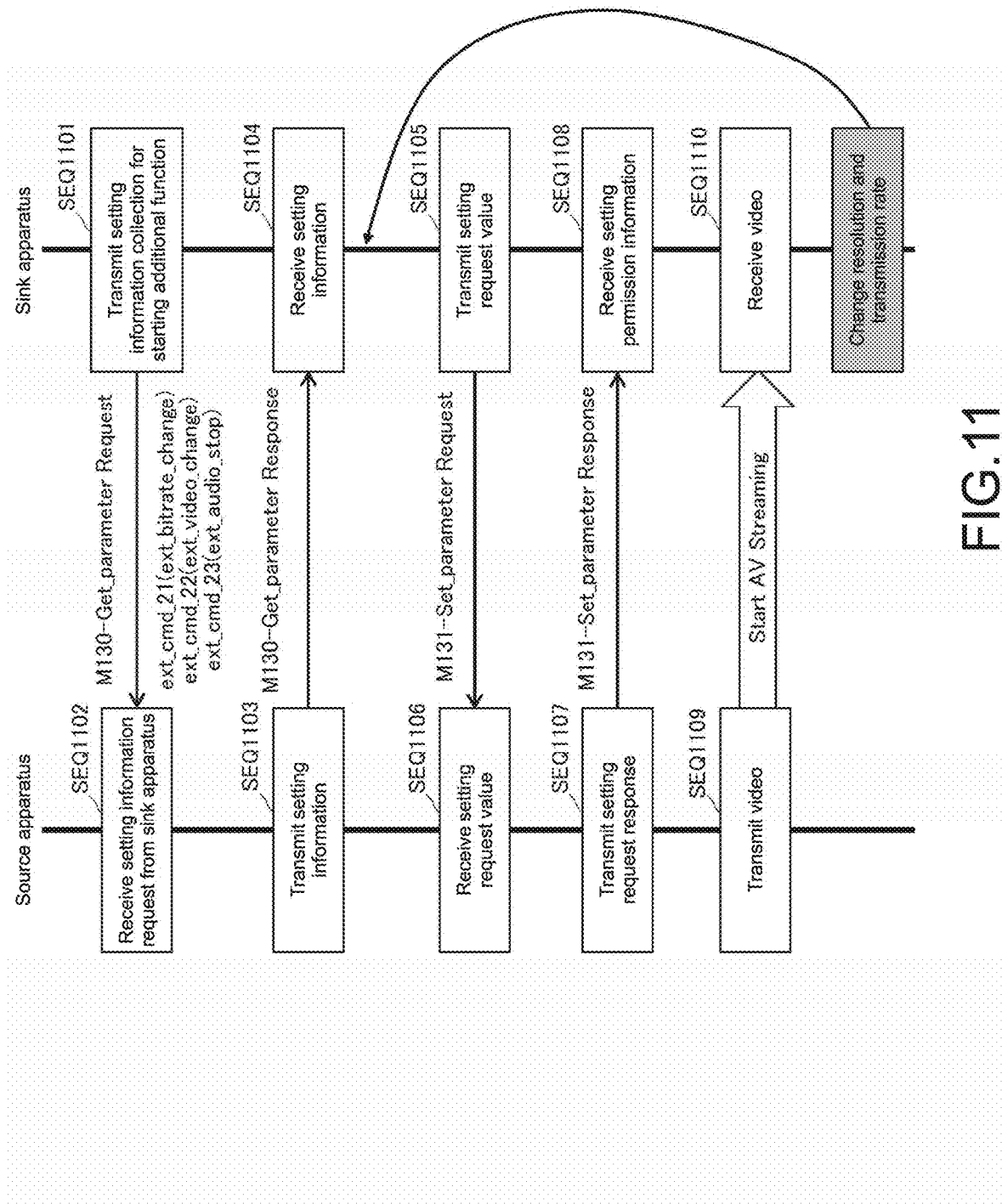
FIG. 11 is a diagram showing an example of a communication sequence (after AV transmission) of an additional RTSP message.

Next, an example of the exchange of the RTSP message in the case where the sink apparatus requests for the change in the resolution of the source apparatus to 1024×768p30 after receiving the setting information (using Get_Parameter Response) will be described with reference to FIG. 11.

The sink apparatus transmits setting information collection for starting an additional function to the source apparatus (SEQ1101). When receiving the setting information request from the sink apparatus (SEQ1102), the source apparatus transmits resolution information as the setting information to the sink apparatus (SEQ1103). The sink apparatus receives the resolution information from the source apparatus (SEQ1104). Specifically, the sink apparatus transmits GET_Parameter to the source apparatus, and receives Response from the source apparatus.

Then, the sink apparatus selects a resolution as a desired setting request value on the basis of the received setting information, and transmits it to the source apparatus (SEQ1105). When receiving the resolution information as the setting request value (SEQ1106), the source apparatus transmits the setting request response to the sink apparatus (SEQ1107). The sink apparatus receives setting permission information from the source apparatus (SEQ1108).

After the source apparatus receives the setting change, the exchange between the source apparatus and the sink apparatus is the operation equivalent to Miracast Release1. The source apparatus performs AV data transmission processing with the setting content of the setting request transmitted in SEQ1106 (SEQ1109), and AV streaming as the Miracast Release1 operation is started. Then, the sink apparatus performs data reception processing of an AV stream (SEQ1110). Further, the sink apparatus changes the resolution and transmission rate as internal processing.

The exchange of the RTSP message (SEQ1105 to 1108) in the case where the sink apparatus requests the source apparatus to change the resolution is performed in the procedure including the following two steps by using the above-mentioned ext_cmd_22.

(Step 1) The sink apparatus transmits, to the source apparatus, a request for changing the resolution to 1024×768p30 by the ext_cmd_22 command.

(Step 2) The source apparatus sends back an indication that has understood the message's instruction to the sink apparatus.

A usage example of the RTSP additional RTSP message in the case where the sink apparatus requests the source apparatus to change the resolution is shown in FIG. 12.

Further, the exchange in the case where the sink apparatus request the source apparatus to change the resolution in accordance with the technology disclosed in the specification is not limited to the above. For example, it may be performed in the procedure including the following two steps.

(Step 1) The sink apparatus transmits, to the source apparatus, a request for changing the resolution to any one of 1920×1080p60, 1920×1080p30, and 1024×768p30 by the ext_cmd_22 command.

(Step 2) The source apparatus sends back an indication that has understood the resolution of 1024×768p30 to the sink apparatus in the message's instruction.

Next, the exchange of the RTSP message in the case where the sink apparatus requests the source apparatus to change the bit rate will be described. For example, in the case where the present bit rate is requested to be changed to 50% (halved), it is performed in the procedure including the following two steps by using the abovementioned ext_cmd_21. A usage example of the RTSP additional RTSP message in the case where the sink apparatus requests the source apparatus to change the bit rate is shown in FIG. 13.

(Step 1) The sink apparatus transmits, to the source apparatus, a request for reducing the bit rate to 50% by the ext_cmd_21 command.

(Step 2) The source apparatus sends back an indication that has understood the message's instruction to the sink apparatus.

Next, the exchange of the RTSP message in the case where the sink apparatus requests the source apparatus to change the bit rate while designating the data transmission rate will be described. For example, in the case where the present bit rate is requested to be changed to 80% while reducing the data transmission rate to (for example,) not more than 6 Mbps, it is performed in the procedure including the following two steps. The sink apparatus requests for changing the present bit rate to 80% by using the abovementioned ext_cmd_21, and transmits an indication that the band given to the source apparatus is up to 6 Mbps. A usage example of the RTSP additional RTSP message in the case where the sink apparatus requests the source apparatus to change the bit rate is shown in FIG. 14.

(Step 1) The sink apparatus transmits, to the source apparatus, a request for reducing the bit rate to 80% and that represents the upper limit of the data transmission rate is 6 Mbps (6000 kbps) by using the ext_cmd_21 command.

(Step 2) The source apparatus sends back an indication that has understood the message's instruction to the sink apparatus.

Next, the exchange of the RTSP message in the case where the sink apparatus requests the source apparatus to change the refresh rate will be described. For example, the exchange of the RTSP message in the case where the sink apparatus requests for reducing the refresh rate to (for example) not more than 30 fps, is performed in the procedure including the following two steps by using the abovementioned ext_cmd_23.

(Step 1) The sink apparatus sends back a medium setting value 30 for reducing the refresh rate to not more than 30 fps to the source apparatus by the ext_cmd_23 command. (Step 2) The source apparatus sends back an indication that has understood the message's instruction to the sink apparatus.

A usage example of the RTSP additional RTSP message in the case where the sink apparatus requests the source apparatus to change the refresh rate is shown in FIG. 29.

Example 2

In a second Example, in a system equivalent to Miracast Release1 with no RTSP message for the sink apparatus to have a medium setting value (a resolution, an image compression method, an audio compression method, a video or audio output format, etc.), the source apparatus changes a medium setting value (e.g., a resolution, an image compression method, an audio compression method, a video or audio output format, etc.) in response to a request from the sink apparatus. Note that although a multi-source topology is assumed in the communication system 600 shown in FIG. 1, description will be made on the assumption of a single-source topology in the first example.

Figure 15:
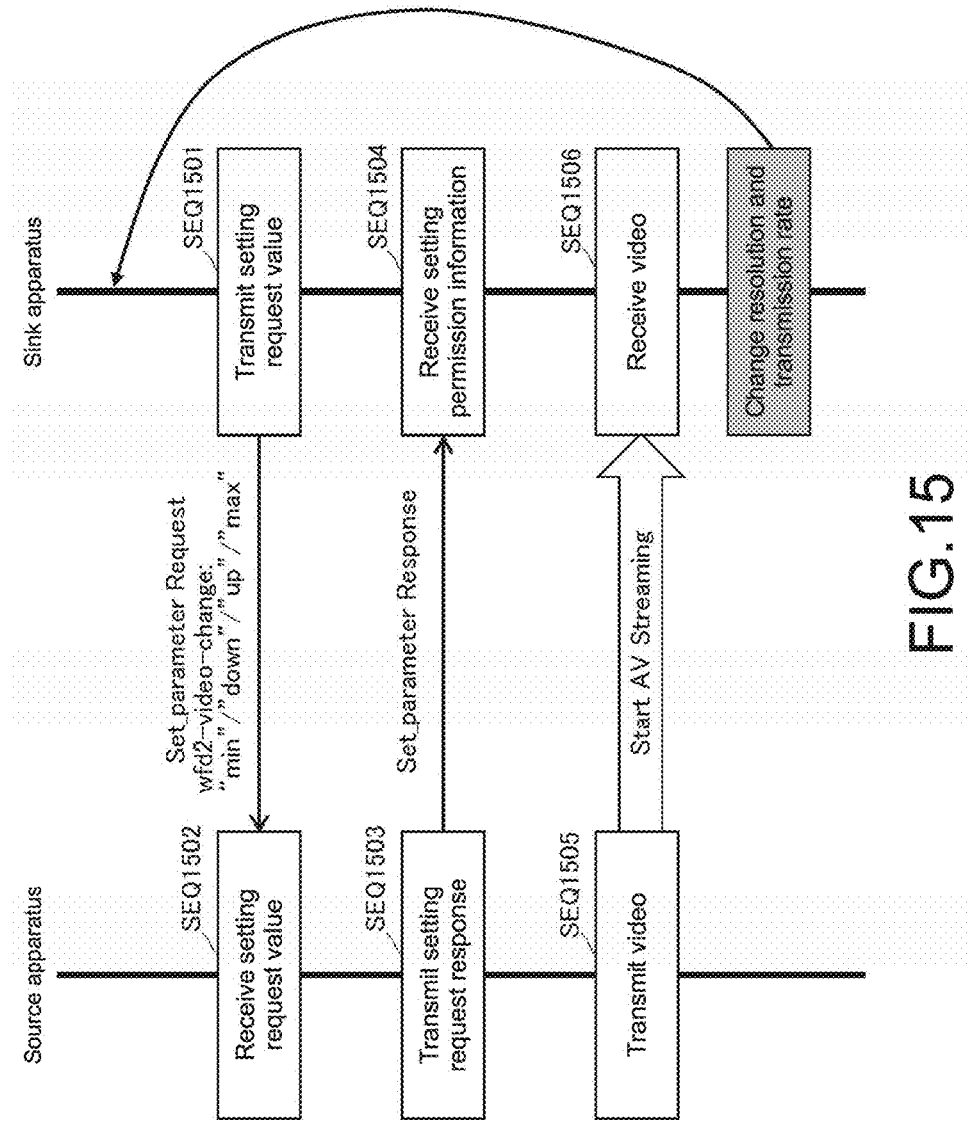
FIG. 15 is a diagram showing an example of a communication sequence of an RTSP message for the source apparatus to change a medium setting value in response to a request from the sink apparatus.

In FIG. 15, an example of a communication sequence between the source apparatus and the sink apparatus in this example is shown.

The sink apparatus transmits a desired medium setting request value (e.g., a resolution, an image compression method, an audio compression method, a video or audio output format, etc.) to the source apparatus (SEQ1501). When receiving the medium setting request value (SEQ1502), the source apparatus transmits a setting request response to the sink apparatus (SEQ1503). The sink apparatus receives setting permission information from the source apparatus (SEQ1504).

After the source apparatus receives the change in the medium setting value, the exchange between the source apparatus and the sink apparatus is the operation equivalent to Miracast Release1. The source apparatus performs video transmission processing with the setting content of the setting request received in SEQ1502 (SEQ1505), AV streaming as the Miracast Release1 operation is started. Then, the sink apparatus performs video processing (SEQ1506). Further, the sink apparatus changes the resolution and transmission rate as internal processing.

The sink apparatus transmits wfd2-video-change: "min"/"down"/"up"/"max" using SET_PARAMETER Request that is an RTSP message to the source apparatus in SEQ1501. The meanings of "min"/"down"/"up"/"max" are defined as follows.

"min" designates a value of a term having the minimum value, of terms common between the information processing apparatuses "max" designates a value of a term having the maximum value, of the terms common between the information processing apparatuses "down" designates a value of a term one level lower than the term that is currently used "up" designates a value of a term one level higher than the term that is currently used For example, in the case where the resolution supported by the source apparatus is 1920×1080p30 (resolution F), 1920×1080p25 (resolution E), 1280×720p60 (resolution D), 720×576p50 (resolution B), and 640×480p60 (resolution A) and the resolution supported by the sink apparatus is 1920×1080p60 (resolution G), 1920×1080p30 (resolution F), 1280×720p60 (resolution D), 1280×720p30 (resolution C), and 640×480p60 (resolution A), the resolution common between the source apparatus and the sink apparatus is A, D, and F.

Figure 16:
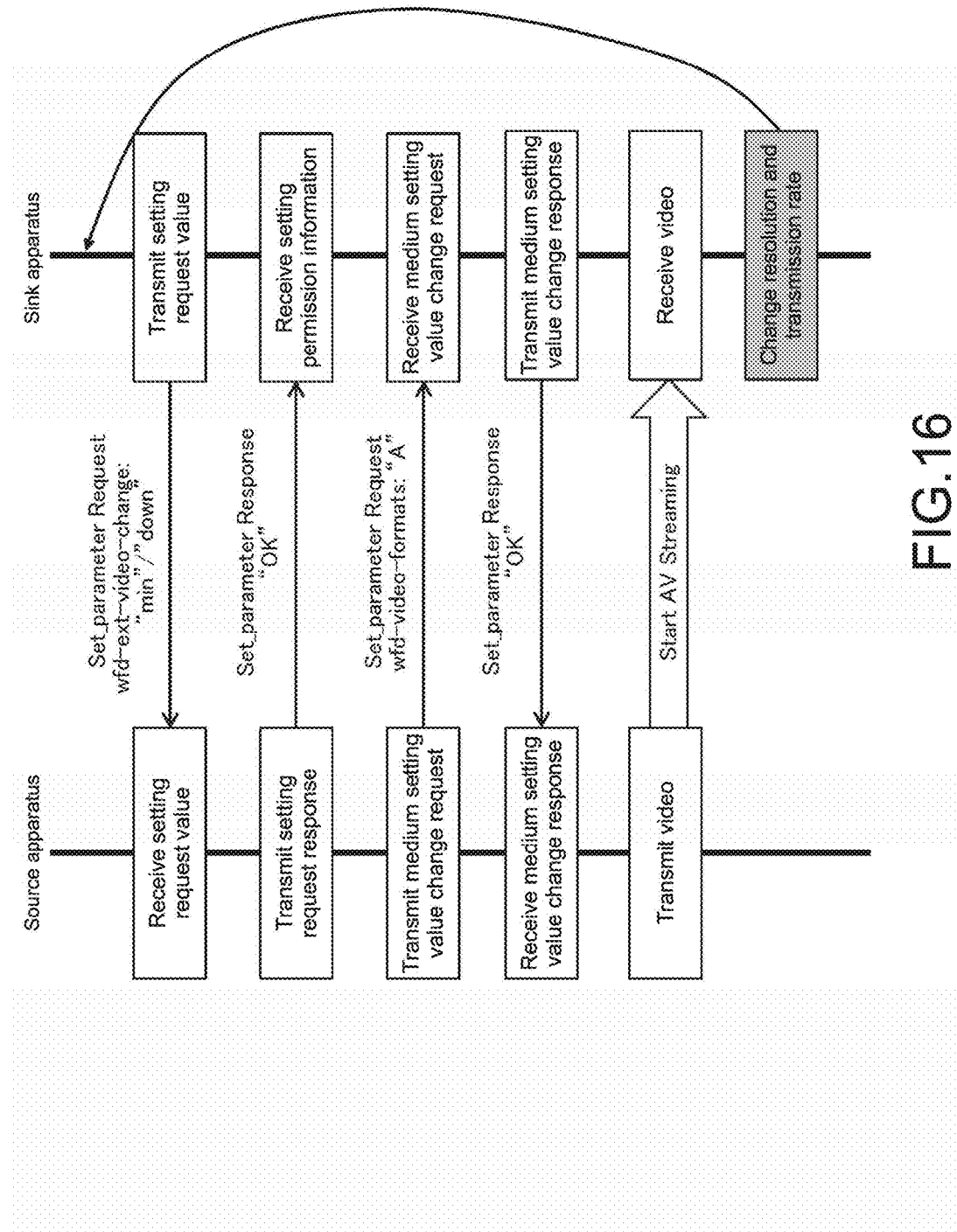
FIG. 16 is a diagram showing an example of a communication sequence of an RTSP message for the source apparatus to change a medium setting value in response to a request from the sink apparatus.

Here, when the resolution between the source apparatus and the sink apparatus is 1280×720p60 (resolution D), there is a possible case where the sink apparatus designates min or down for the source apparatus and the source apparatus designates the resolution A for the sink apparatus by using SET_PARAMETER Request that is an RTSP message. An example of a communication sequence of the RTSP message between the source apparatus and the sink apparatus in this case is shown in FIG. 16.

Figure 17:
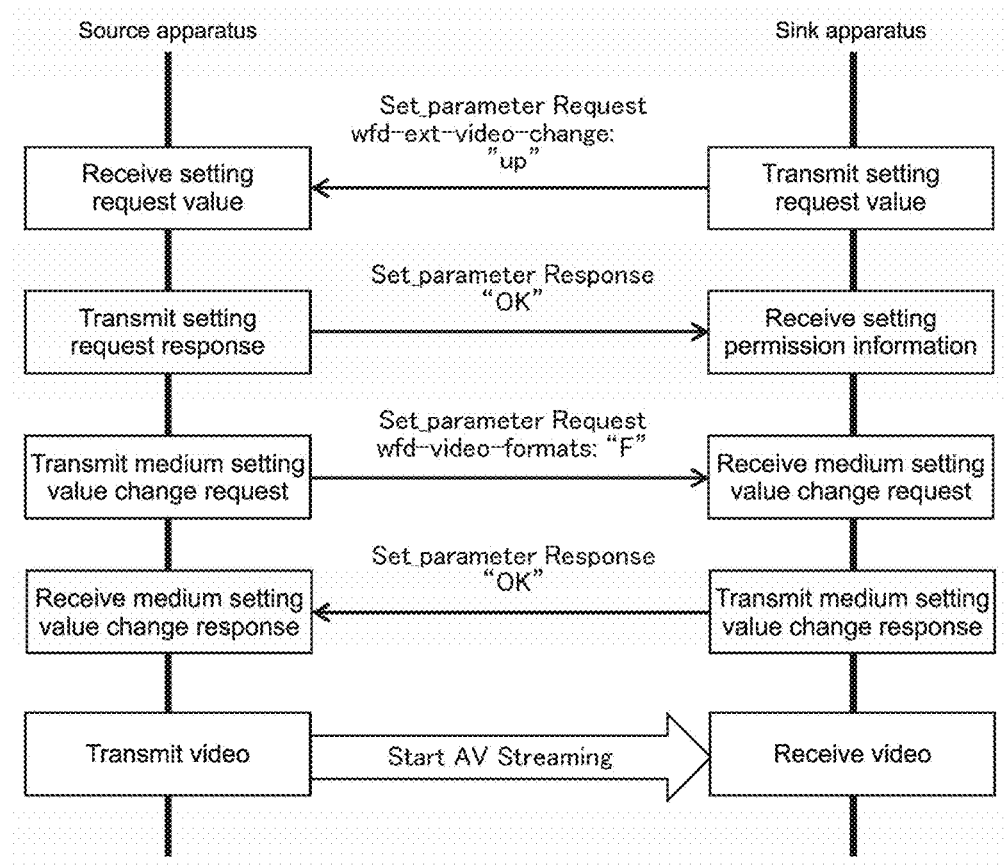
FIG. 17 is a diagram showing an example of a communication sequence of an RTSP message for the source apparatus to change a medium setting value in response to a request from the sink apparatus.

Further, in the case where the resolution between the source apparatus and the sink apparatus is 1280×720p60 (resolution D), there is a possible case where the sink apparatus designates up or max for the source apparatus and the source apparatus designates the resolution F for the sink apparatus by using SET_PARAMETER Request that is an RTSP message. An example of a communication sequence of the RTSP message between the source apparatus and the sink apparatus in this case is shown in FIG. 17.

Figure 18:
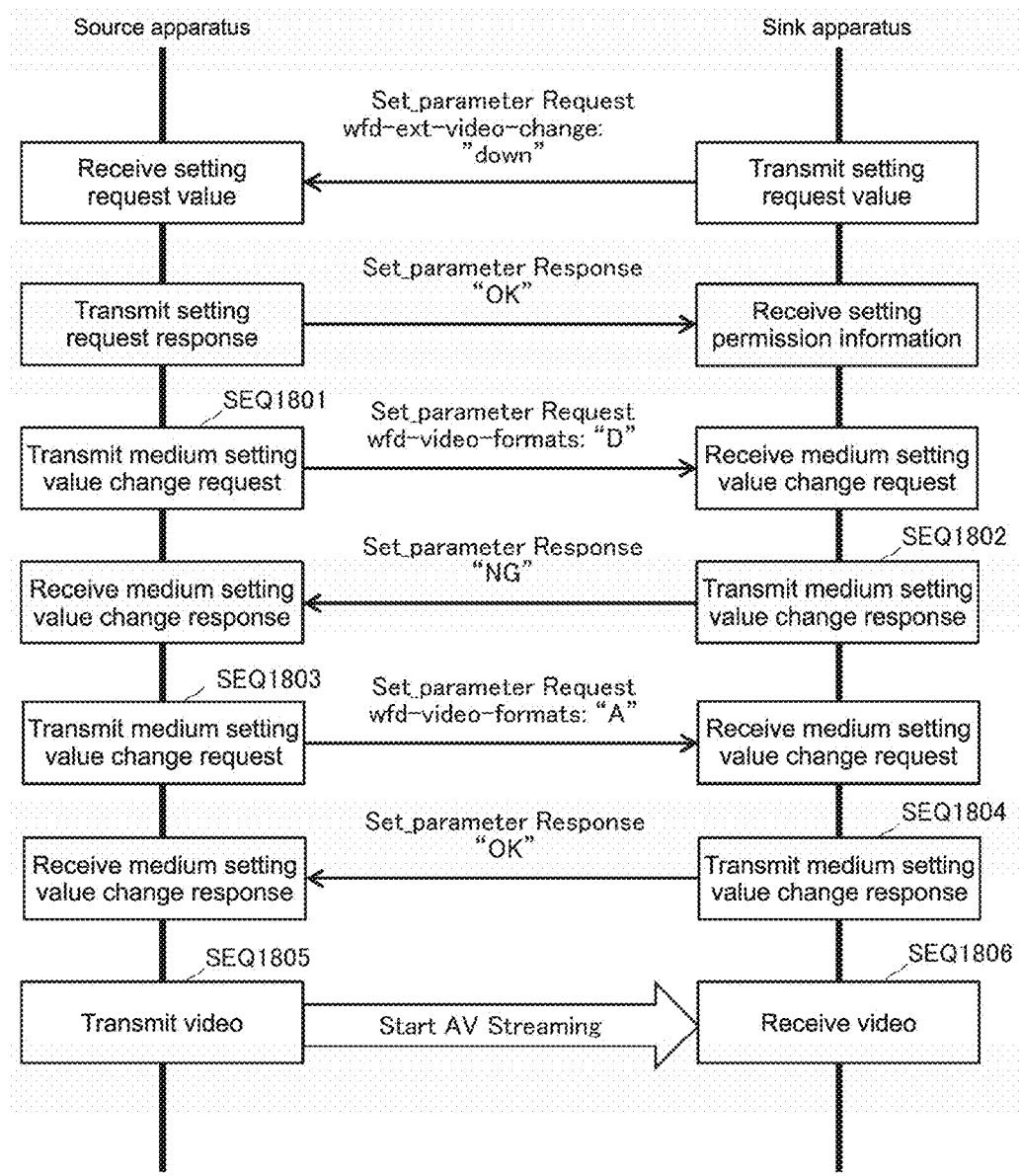
FIG. 18 is a diagram showing an example of a communication sequence of an RTSP message for the source apparatus to change a medium setting value in response to a request from the sink apparatus.

Further, in FIG. 18, an example of a communication sequence when the sink apparatus designates down for the source apparatus in the case where the resolution between the source apparatus and the sink apparatus is 1920×1080p30 (resolution F) is shown.

The source apparatus designates the resolution D for the sink apparatus by using SET_PARAMETER Request that is an RTSP message (SEQ1801). On the other hand, although the sink apparatus may send back OK as Set_Parameter Response that is an RTSP message to the source apparatus, the sink apparatus sends back NG in the illustrated example because the resolution is desired to be further decreased (SEQ1802).

Because the source apparatus has received NG from the sink apparatus, the source apparatus designates the resolution A that is further low by using SET_PARAMETER Request (SEQ1803). On the other hand, the sink apparatus sends back OK as Set_Parameter Response that is an RTSP message to the source apparatus (SEQ1804).

After the source apparatus receives the change in the medium setting value, the exchange between the source apparatus and the sink apparatus is the operation equivalent to Miracast Release1. The source apparatus performs video transmission with the resolution A received in SEQ1804 (SEQ1805), and AV streaming as the Miracast Release1 operation is started. Then, the sink apparatus performs video processing (SEQ1806).

Figure 19:
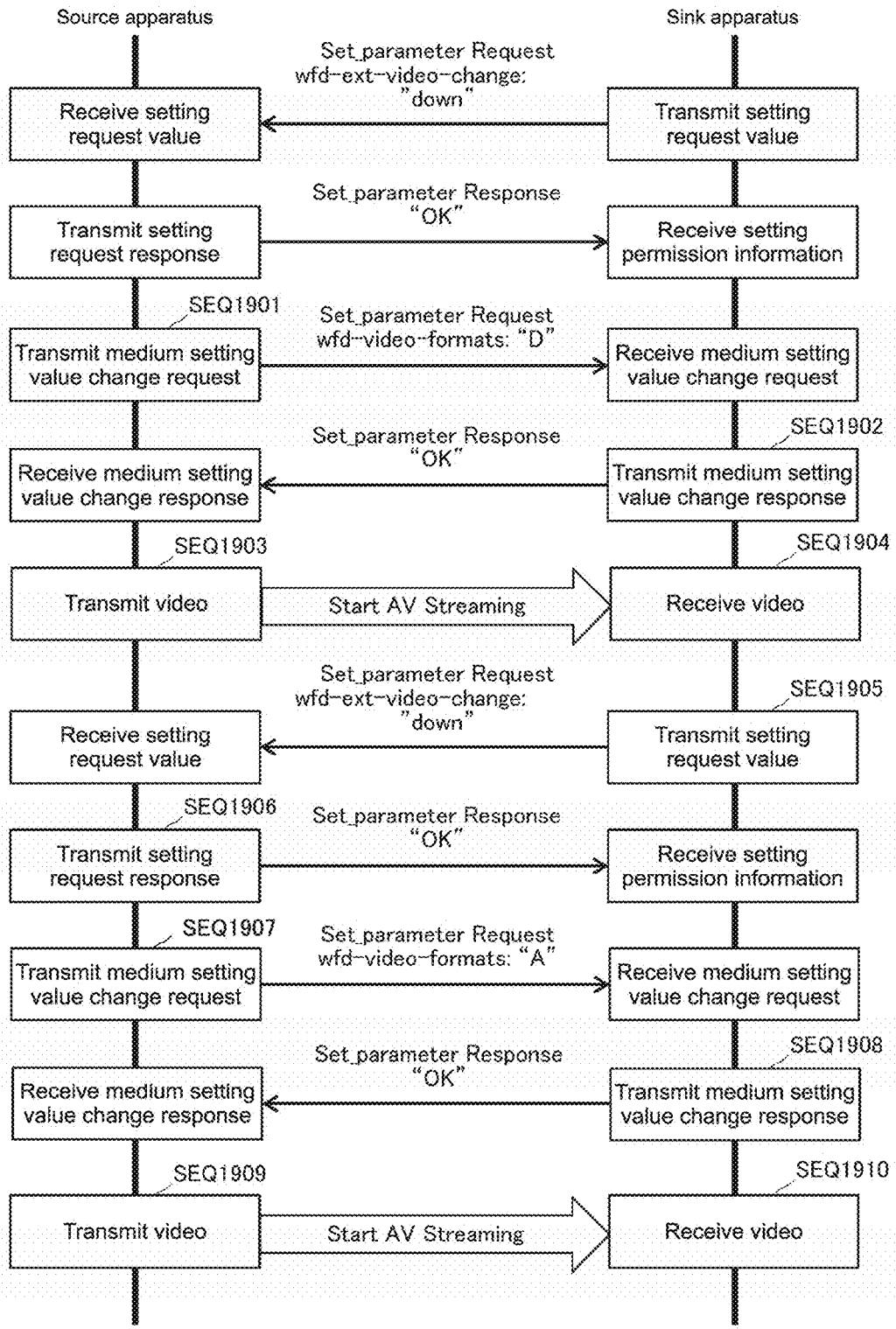
FIG. 19 is a diagram showing an example of a communication sequence of an RTSP message for the source apparatus to change a medium setting value in response to a request from the sink apparatus.

In FIG. 19, a modified example of the example of the communication sequence shown in FIG. 18 is shown.

The source apparatus designates the resolution D by using SET_PARAMETER Request that is an RTSP message for the sink apparatus (SEQ1901). On the other hand, the sink apparatus sends back OK as Set_Parameter Response that is an RTSP message to the source apparatus in the case where the resolution is desired to be further reduced to be lower than the resolution D (SEQ1902). Accordingly, the source apparatus performs video transmission processing with the resolution D designated in SEQ1901 (SEQ1903), and AV streaming as the Miracast Release1 operation is started once. Then, the sink apparatus performs video processing (SEQ1904).

After that, when wfd-video-change: "down" is transmitted by using SET_PARAMETER request from the sink apparatus (SEQ1905), the source apparatus accepts the reduction in the resolution and sends back OK (SEQ1906).

Next, the source apparatus designates the resolution A by using SET_PARAMETER Request that is an RTSP message for the sink apparatus (SEQ1907). On the other hand, the sink apparatus sends back OK as Set_Parameter Response that is an RTSP message to the source apparatus (SEQ1908). Accordingly, the source apparatus performs video transmission processing with the resolution A (SEQ1909), and AV streaming as the Miracast Release1 operation is started. Then, the sink apparatus performs video processing (SEQ1910).

In addition, as shown in FIG. 20, such a method that the sink apparatus transmits u or max to the source apparatus before the source apparatus sends back "NG": reason code=reach to max to the sink apparatus may be used.

Example 3

The above-mentioned first and second examples relate to a method of changing a medium setting value between the source apparatus and the sink apparatus wirelessly connected through P2P communication. On the other hand, in a third example, a multi-source topology environment is assumed.

Figure 26:
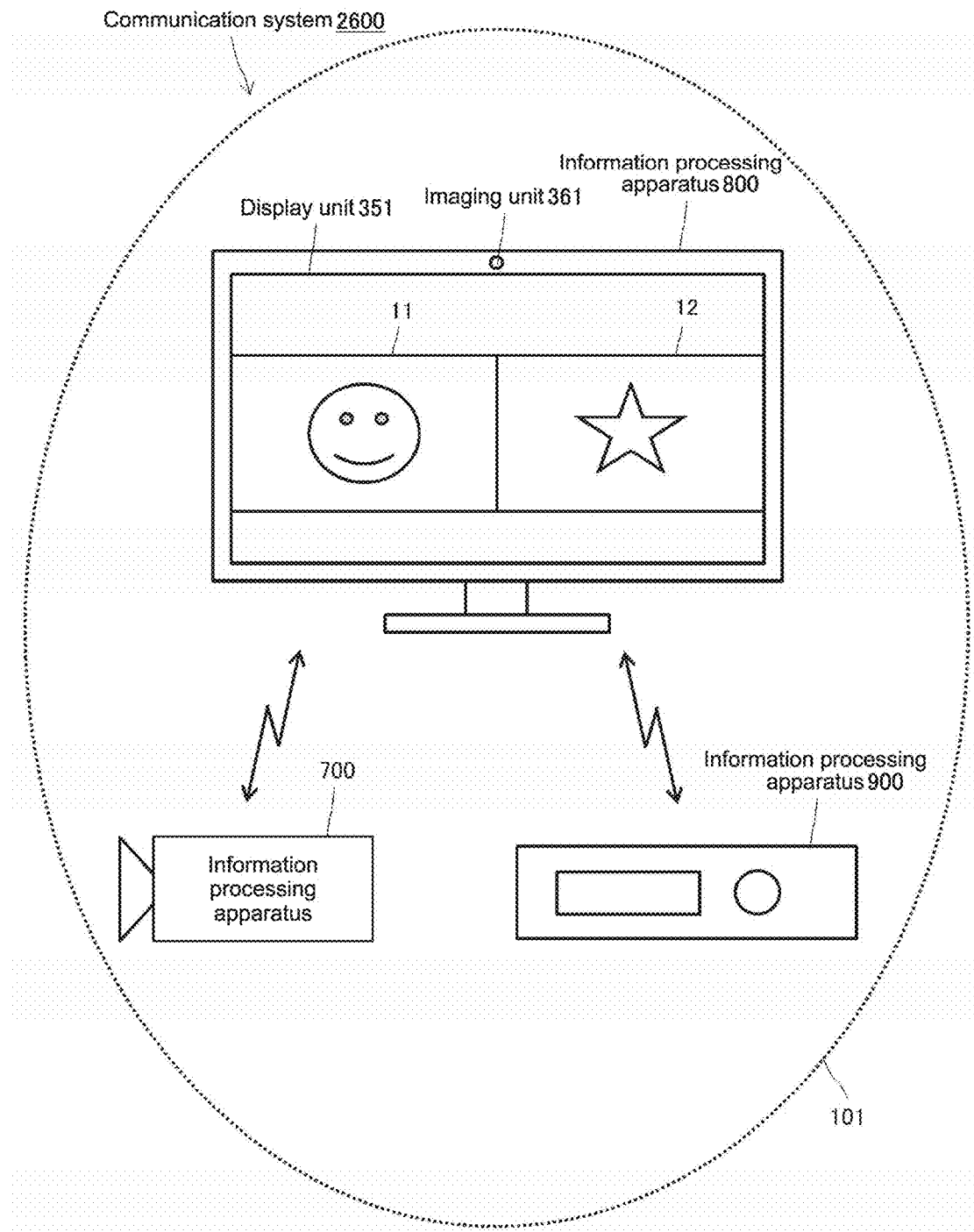
FIG. 26 is a diagram showing a configuration example of a communication system 2600 in a multi-source/topology environment.

In the communication system 600 shown in FIG. 1, although the information processing apparatus 700, which is one of two source apparatuses, is P2P connected to the information processing apparatus 800 as the sink apparatus, the information processing apparatus 900, which is the other source apparatus, is wire-connected to the information processing apparatus 800. As shown in FIG. 26, when the connection between the information processing apparatus 800 and the information processing apparatus 900 is changed to wireless connection, the communication system 2600 in a multi-source topology environment is obtained. Specifically, it is assumed that a plurality of images based on image data transmitted from a plurality of information processing apparatuses on the transmission side are displayed on a display unit of an information processing apparatus on the reception side. In such a case, such band control that a data transmission rate is assigned to an information processing apparatus that needs medium display or reproduction with high quality depending on the display state as much as possible in the limited wireless band is favorable, and the band control method is an issue.

Figure 27:
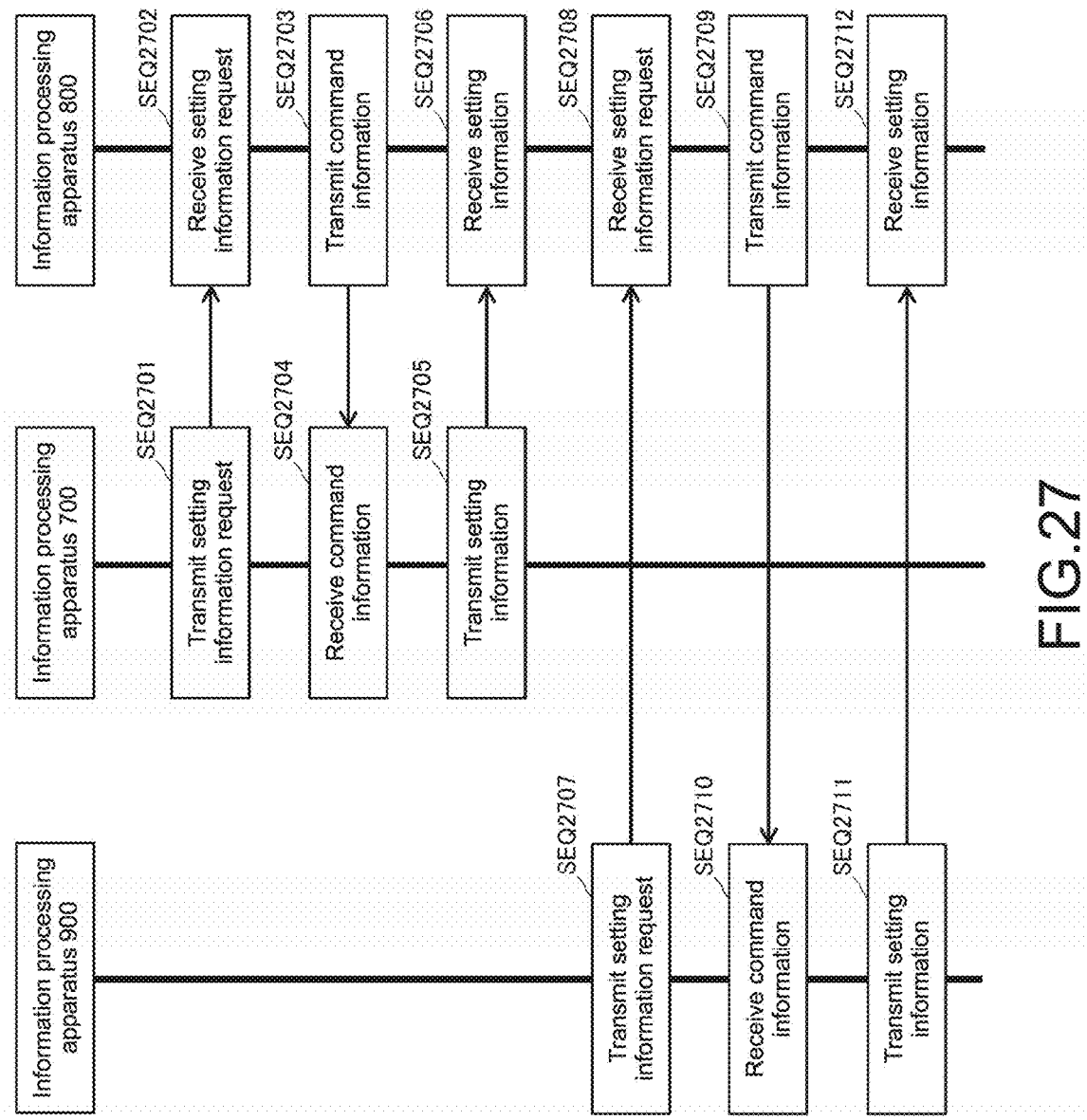
FIG. 27 is a diagram showing an example of a communication sequence between respective apparatuses constituting the communication system 2600 shown in FIG. 26.

In FIG. 27, an example of a communication sequence between respective apparatuses constituting the communication system 2600 shown in FIG. 26 is shown. In the communication sequence example shown in FIG. 27, the information processing apparatus 800 as the sink apparatus acquires management information related to the information processing apparatus 700 and the information processing apparatus 900 as the source apparatuses from them.

The information processing apparatus 700 periodically or irregularly (including only at the time of starting) transmits the setting information request to the information processing apparatus 800 (SEQ2701). This setting information request is for requesting for transmission of a medium setting value of a resolution, an image compression method, a video output format, sound quality, an audio compression method, an audio output format, and the like set in the information processing apparatus 800.

When receiving the setting information request (SEQ2702), the information processing apparatus 800 transmits command information depending on the setting information request (SEQ2703). The command information is information containing a medium setting value for the information processing apparatus 700 to take into account the radio wave propagation environment with the information processing apparatus 800 and the display form of video in the information processing apparatus 800 and request setting for the information processing apparatus 700. Further, the command information is contained as a part of the Capability information.

When receiving the command information (SEQ2704), the information processing apparatus 700 appropriately changes the medium setting value of its own on the basis of the command information, and transmits the changed setting information to the information processing apparatus 800 (SEQ2705, SEQ2706).

Similarly, the information processing apparatus 900 periodically or irregularly (including only at the time of starting) transmits the setting information request to the information processing apparatus 800 (SEQ2707). When receiving the setting information request (SEQ2708), the information processing apparatus 800 transmits the command information depending on the setting information request (SEQ2709). Then, when receiving the command information (SEQ2710), the information processing apparatus 900 appropriately changes the medium setting value of its own on the basis of the command information, and transmits the changed setting information to the information processing apparatus 800 (SEQ2711, SEQ2712).

Figure 28:
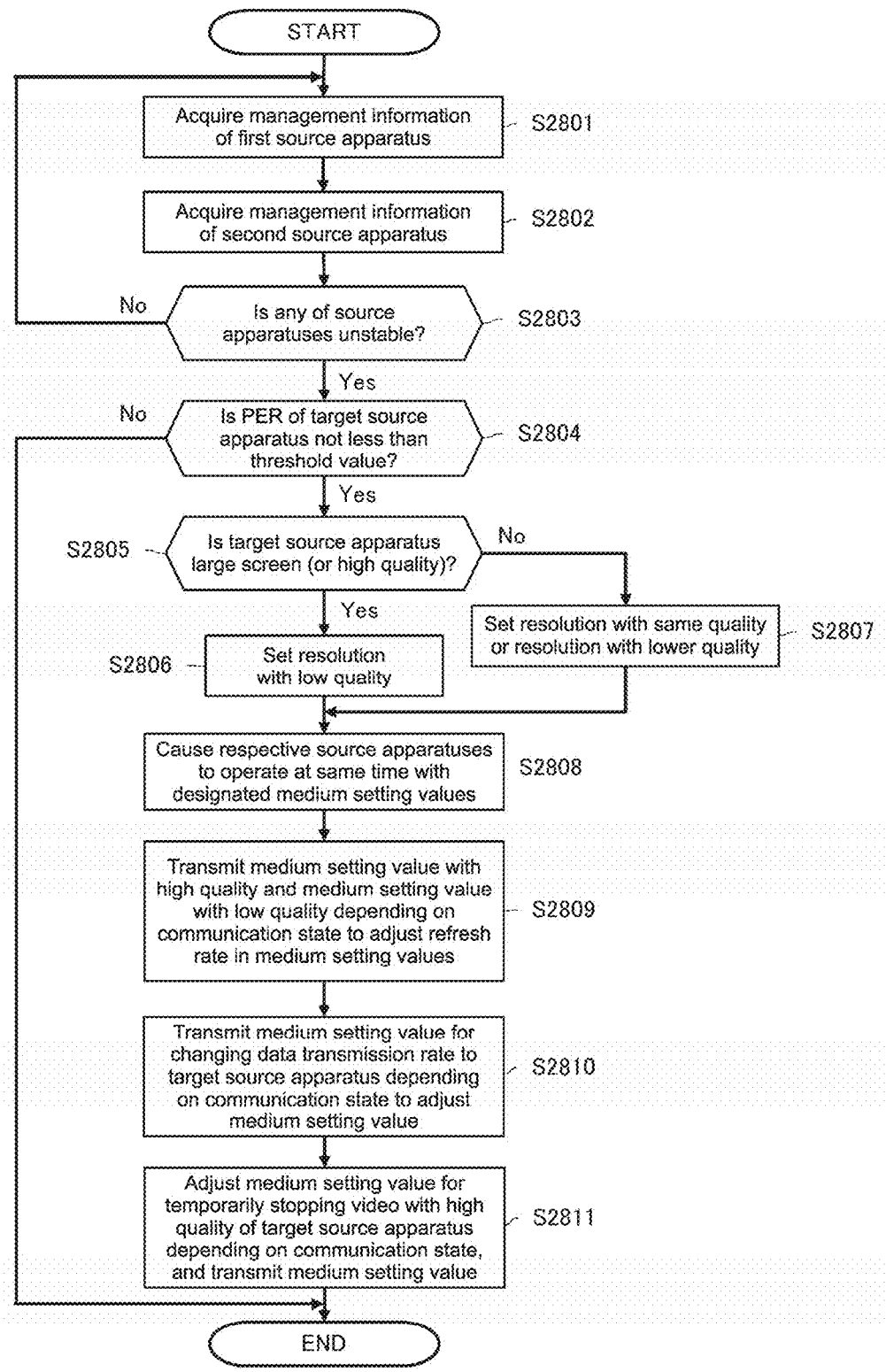
FIG. 28 is a flowchart showing the procedure of an operation executed by the information processing apparatus 800 as the sink apparatus in a multi-source/topology environment.

In FIG. 28, the procedure of an operation performed by the information processing apparatus 800 as the sink apparatus in a multi-source topology environment is shown in the flowchart format. Note that assumption is made that the information processing apparatus 800 is connected to the information processing apparatus 700 as the first source apparatus by a first link and to the information processing apparatus 900 as the second source apparatus by a second link, and content transmission is performed at the first link and the second link at the time when the operation procedure shown in FIG. 28 is started in the communication system 2600 in the multi-source topology environment shown in FIG. 26.

First, the control unit 370 acquires management information of the information processing apparatus 700 as the first source apparatus (Step S2801). Next, the control unit 370 acquires management information of the information processing apparatus 900 as the second source apparatus (Step S2802). It is possible to acquire management information from each source apparatus in accordance with the communication sequence shown in FIG. 27. The acquired management information is stored in the management information storing unit 390.

Next, the control unit 370 determines whether or not each source apparatus connected to the information processing apparatus 800 is unstable (Step S2803). Note that "the source apparatus is unstable" represents that the image displayed on the display unit 351 is disturbed, for example. Then, in the case where all the source apparatuses are not unstable (No in Step S2803), the processing returns to Step S2801.

On the other hand, in the case where any one of source apparatuses is unstable (Yes in Step S2803), determination on the basis of the stability of the link of the unstable source apparatus (hereinafter, referred to as "target source apparatus") is performed (Step S2804). Specifically, the control unit 370 determines whether or not the PER (Packet Error Rate) of the target source apparatus is not less than a threshold value.

In the case where the PER of the target source apparatus is less than a threshold value (No in Step S2804), the operation of this processing is finished because it can be determined that the link to any of the source apparatuses is stable.

Note that although an example in which the PER is used as an index when the stability of the link is determined is shown in FIG. 28, another index may be used. For example, it may be possible to determine the stability of the link by using a BER (Bit Error Rate), RSSI (Receivec Signal Strength Indicator), number of times of retransmission of a packet, throughput, drop frame, SIR (Signal to Interference Ratio), and the like as an index.

Further, in the case where the PER of the target source apparatus is not less than a threshold value (Yes in Step S2804), the control unit 370 further determines whether or not the target source apparatus is a large screen (or screen display with high quality) (Step S2805). Then, in the case where the target source apparatus is a large screen or currently set in screen display with high quality (Yes in Step S2805), a resolution with low quality is set to the target source apparatus (Step S2806). On the other hand, in the case where the target source apparatus is not a large screen and currently not set in screen display with high quality (No in Step S2805), the resolution with the same quality or resolution with lower quality is set to the target source apparatus (Step S2807). Note that in the case where a resolution smaller than that of the display window is set in Step 2806 or Step 2807, the sink apparatus may rescale the image to the size of the display window with the function of the sink apparatus and display the rescaled image, or change the window size displayed on the sink apparatus to the set resolution and display the image. Further, in the former case, in the case where the set resolution is smaller than the size of the display window, an algorithm for preventing video from blurring as much as possible may be executed because video blurs.

Then, the control unit 370 causes the first source apparatus and the second source apparatus to operate at the same time with medium setting values set therefor (Step S2808).

Next, the control unit 370 transmits a medium setting value with high quality and a medium setting value with low quality depending on the communication state to adjust the refresh rate in the medium setting values (Step S2809).

Further, the control unit 370 transmits a medium setting value for changing the data transmission rate to the target source apparatus depending on the communication state to adjust the medium setting value (Step S2810).

Further, the control unit 370 adjusts a medium setting value for temporarily stopping video with low quality of the target source apparatus depending on the communication state, and transmits the medium setting value (Step S2811).

INDUSTRIAL APPLICABILITY

In the case where a medium setting value of the source apparatus is changed in response to a request from the sink apparatus in the Wi-Fi Direct standard normalized in Wi-Fi Alliance, it needs to perform Device discovery, connection processing of the second layer, processing of establishing secure link, IP address assigning processing, and the like (see FIG. 5), again. Therefore, collision due to use of resources on a wireless section is increased, and user's waiting time is increased by the time necessary for the processing.

On the other hand, according to the technology disclosed in the specification, an RTSP parameter having high affinity with Miracast Release1 is newly provided. Accordingly, it is possible to reduce resources on a wireless section also in the communication sequence in which a medium setting value of the source apparatus is changed in response to a request from the sink apparatus, and achieve the communication sequence in which the user does not feel the waiting time.

According to the technology disclosed in the specification, it is possible to provide a method of setting a medium setting information to reduce the interference from a different wireless apparatus as much as possible in an environment in which connection is established between information processing apparatuses using Wi-Fi Direct, Further, a multi-source topology environment, i.e., causing a display unit of a reception-side information processing apparatus to display a plurality of images based on image data transmitted from a plurality of transmission-side information processing apparatuses is also assumed. Such band control that a data transmission rate is assigned to an information processing apparatus that needs medium display or reproduction with high quality depending on the display state as much as possible in the limited wireless band is favorable. According to the technology disclosed in the specification, it is possible to provide such a band control method.

The technology disclosed in the specification can be applied to various products. For example, the information processing apparatuses 700, 800, and 900 may each be configured as a multifunctional information terminal such as a smartphone and a tablet, a personal computer, a game machine, a digital camera, another mobile terminal, a television receiver, a printer, a digital scanner, a network storage device, another fixed terminal, or an on-vehicle terminal such as a car navigation apparatus. Further, the information processing apparatuses 700, 800, and 900 may each be configured as a smart meter, a vending machine, a remote monitoring apparatus, an M2M (Machine to Machine) terminal such as a POS (Point Of Sale) terminal, or an MTC (Machine Type Communication) terminal. Further, the information processing apparatuses 700, 800, and 900 may each be a wireless communication module (e.g. integrated circuit including one die) mounted on these terminals.

Further, the processing procedures described in the above embodiments may be construed as methods including those series of procedures or a program for causing a computer to execute those series of procedures or may be construed as a recording medium storing that program. As this recording medium, a CD (Compact Disc), an MD (Mini Disc), a DVD (Digital Versatile Disc), a memory card, and a Blu-ray (registered trademark) disc can be used, for example.

In the specification, the technology disclosed in the specification has been described in detail with reference to a particular embodiment. However, it is obvious that various modifications or substitutions can be made to the embodiment by a person skilled in the art without departing from the essence of the technology disclosed in the specification.

In the specification, the embodiment applied to an environment in which connection is established between information processing apparatuses using Wi-Fi Direct has been mainly described. However, the essence of the technology disclosed in the specification is not limited thereto. The technology disclosed in the specification can be similarly applied to also an environment in which image data is transmitted using other various wireless transmission standards.

In short, the technology disclosed in the specification has been described hereinabove merely as an example, and hence the content described in the specification should not be limitedly construed. The essence of the technology disclosed in the specification should be determined with reference to the appended claims.

It should be noted that the technology disclosed in the specification may take the following configurations.

(1) An information processing apparatus that receives data from a different information processing apparatus, the different information processing apparatus being wirelessly connected to the information processing apparatus, the information processing apparatus including:

a Capability information transmission unit that transmits Capability information of the information processing apparatus in response to an inquiry from the different information processing apparatus;

a control unit that controls a medium setting value related to the different information processing apparatus on the basis of the Capability information related to the information processing apparatus, resolution information related to communication with the different information processing apparatus, and a reproduction output format of the data received by the information processing apparatus; and a medium setting value transmission unit that transmits information related to the medium setting value selected by the control unit to the different information processing apparatus.

(2) The information processing apparatus according to (1) above, in which the Capability information transmission unit transmits the Capability information of the information processing apparatus as Capability Negotiation processing of Miracast Release1, and the medium setting value transmission unit transmits information related to the medium setting value as processing of extending a Miracast function.

(3) The information processing apparatus according to (2) above, in which the resolution information related to communication with the different information processing apparatus is received as the Capability Negotiation processing.

(4) The information processing apparatus according to (1) above, further including an extended function transmission unit that sends back a response message containing an RTSP parameter that represents whether or not Miracast extended function information is implemented, in response to reception of a request message containing an RTSP parameter for requesting for Miracast extended function information from the different information processing apparatus.

(5) The information processing apparatus according to (1) above, further including a medium setting value inquiry unit that makes an inquiry to the different information processing apparatus about a medium setting value that the different information processing apparatus is capable of transmitting, in which the control unit controls the medium setting value related to the different information processing apparatus on the basis of a response to the inquiry.

(6) The information processing apparatus according to (1) above, in which the control unit controls a medium setting value for increasing or decreasing a data transmission rate with reference to the medium setting value that is currently set.

(7) The information processing apparatus according to claim 6, in which the control unit makes a request for changing a medium setting value by using min (that designates a value of a term having the minimum value, of terms common to the different information processing apparatus), max (that designates a value of a term having the maximum value, of the terms common to the different information processing apparatus), down (that designates a value of a term one level lower than the term that is currently used), and up (that designates a value of a term one higher lower than the term that is currently used).

(8) The information processing apparatus according to (7) above, in which the medium setting value transmission unit transmits a request for changing a medium setting value using an RTSP parameter.

(9) The information processing apparatus according to (5) above, in which the control unit selects one or more medium setting values that are common to the medium setting value that the information processing apparatus is capable of receiving and the medium setting value that the different information processing apparatus is capable of transmitting, and controls the medium setting value related to the different information processing apparatus.

(10) The information processing apparatus according to (9) above, in which the medium setting value transmission unit transmits a request for changing the medium setting value that directly designates the one or more medium setting values using an RTSP parameter.

(11) An information processing method, which is executed by an information processing apparatus that receives data from a different information processing apparatus, the different information processing apparatus being wirelessly connected to the information processing apparatus, the information processing method including:

transmitting Capability information of the information processing apparatus in response to an inquiry from the different information processing apparatus;

controlling a medium setting value related to the different information processing apparatus on the basis of the Capability information related to the information processing apparatus, resolution information related to communication with the different information processing apparatus, and a reproduction output format of the data received by the information processing apparatus; and transmitting information related to the medium setting value selected by the control unit to the different information processing apparatus.

(12) A source apparatus directly connected to a sink apparatus on the basis of a wireless LAN system, the source apparatus including:

a control unit that has system performance information of the sink apparatus;

a reception unit that receives a SET PARAMETER REQUEST based on RTSP from the sink apparatus, the SET PARAMETER REQUEST requesting for a resolution higher than the resolution that is currently used; and a transmission unit that performs streaming transmission by using a resolution supported by the source apparatus and the sink apparatus in response to the SET PARAMETER REQUEST.

REFERENCE SIGNS LIST

210 antenna
220 wireless communication unit
230 control signal reception unit
240 control unit
250 image/audio signal generation unit
260 image/audio compression unit
270 stream transmission unit
310 antenna
320 wireless communication unit
330 stream reception unit
340 image/audio development unit
350 image/audio output unit
360 user information acquisition unit
370 control unit
380 control signal transmission unit
390 management information storing unit
600 communication system
700, 800, 900 information processing apparatus

The invention claimed is:

1. A first information processing apparatus, comprising:
a wireless communication unit configured to wirelessly receive data from a second information processing apparatus;
a Capability information transmission unit configured to transmit capability information of the first information processing apparatus to the second information processing apparatus based on an inquiry from the second information processing apparatus;

a control unit configured to:
control a change in a first medium setting value of a plurality of medium setting values based on the capability information of the first information processing apparatus, resolution information related to the second information processing apparatus, and a reproduction output format of the received data, wherein the first medium setting value corresponds to the second information processing apparatus; and
generate a first request message for the second information processing apparatus, wherein the first request message corresponds to the change in the first medium setting value; and
a medium setting value transmission unit configured to transmit the first request message corresponding to the change in the first medium setting value to the second information processing apparatus.

2. The first information processing apparatus according to claim 1, wherein
the Capability information transmission unit is further configured to transmit the capability information of the first information processing apparatus as Capability Negotiation of Miracast Release1, and
the medium setting value transmission unit is further configured to transmit the first medium setting value as extended Miracast function information.

3. The first information processing apparatus according to claim 2, wherein the resolution the second information processing apparatus corresponds to the Capability Negotiation of Miracast Release1.

4. The first information processing apparatus according to claim 1, further comprising
an extended function transmission unit configured to transmit a response message to the second information processing apparatus based on reception of a second request message from the second information processing apparatus, wherein
the response message comprises a first Real Time Streaming Protocol (RTSP) parameter that corresponds to Miracast extended function information, and
the second request message comprises a second RTSP parameter that corresponds to a request for the Miracast extended function information.

5. The first information processing apparatus according to claim 1, wherein
the control unit is further configured to:
transmit an inquiry message to the second information processing apparatus;
receive a response message from the second information processing apparatus based on the inquiry message; and
control the first medium setting value based on the received response message, and
the inquiry message corresponds to a transmission capability of the second information processing apparatus to transmit a first set of medium setting values of the plurality of medium setting values.

6. The first information processing apparatus according to claim 1, wherein
the control unit is further configured to control a data transmission rate based on the first medium setting value.

7. The first information processing apparatus according to claim 6, wherein
the change in the first medium setting value is based on min, max, down, and up,
the min corresponds to a first term of a plurality of terms,
the plurality of terms is associated with the first information processing apparatus and the second information processing apparatus,
a value of the first term corresponds to a minimum value of a plurality of values of the plurality of terms,
the max corresponds to a second term of the plurality of terms,
a value of the second term corresponds to a maximum value of the plurality of values of the plurality of terms,
the down corresponds to a third term of the plurality of terms,
the third term is one level lower than a specific term of the plurality of terms,
the up corresponds to a fourth term of the plurality of terms, and
the fourth term is one level higher than the specific term of the plurality of terms.

8. The first information processing apparatus according to claim 7, wherein
the medium setting value transmission unit is further configured to transmit the first request message based on a Real Time Streaming Protocol (RTSP) parameter.

9. The first information processing apparatus according to claim 5, wherein
the control unit is further configured to select at least one medium setting value of the plurality of medium setting values,
the at least one medium setting value is common to a second set of medium setting values of the plurality of medium setting values and the first set of medium setting values, and
the wireless communication unit is further configured to receive the second set of medium setting values.

10. The first information processing apparatus according to claim 9, wherein
the medium setting value transmission unit is further configured to transmit the first request message to the second information processing apparatus based on a Real Time Streaming Protocol (RTSP) parameter, and
the second information processing apparatus changes the first medium setting value to a second medium setting value of the at least one medium setting value based on the first request message.

11. An information processing method, comprising:
in a first information processing apparatus:
wirelessly receiving data from a second information processing apparatus;
transmitting capability information of the first information processing apparatus to the second information processing apparatus based on an inquiry from the second information processing apparatus;
controlling a change in a medium setting value based on the capability information of the first information processing apparatus, resolution the second information processing apparatus, and a reproduction output format of the received data, wherein the medium setting value corresponds to the second information processing apparatus;
generating a request message for the second information processing apparatus, wherein the request message corresponds to the change in the medium setting value; and
transmitting the request message corresponding to the change in the medium setting value to the second information processing apparatus.

* * * * *